United States Patent
Shimazawa et al.

(10) Patent No.: US 8,325,566 B2
(45) Date of Patent: Dec. 4, 2012

(54) THERMALLY-ASSISTED MAGNETIC RECORDING HEAD HAVING A LIGHT SOURCE AT LEAST INCLINED FROM AN OPPOSED-TO-MEDIUM SURFACE

(75) Inventors: Koji Shimazawa, Tokyo (JP); Eiji Komura, Tokyo (JP)

(73) Assignee: TDK Corporation, Tokyo (JP)

( * ) Notice: Subject to any disclaimer, the term of this patent is extended or adjusted under 35 U.S.C. 154(b) by 103 days.

(21) Appl. No.: 12/407,420

(22) Filed: Mar. 19, 2009

(65) Prior Publication Data

US 2010/0238580 A1 Sep. 23, 2010

(51) Int. Cl.
*G11B 11/00* (2006.01)

(52) U.S. Cl. .................................. 369/13.33; 369/13.13

(58) Field of Classification Search .................... 360/59; 369/13.33, 13.13, 13.32, 13.17, 112.09, 112.14, 369/112.21, 112.27; 385/129; 250/201.3, 250/201.5
See application file for complete search history.

(56) References Cited

U.S. PATENT DOCUMENTS

| | | | |
|---|---|---|---|
| 5,793,790 A | 8/1998 | Doi et al. | |
| 5,946,281 A | 8/1999 | Ito et al. | |
| 6,567,373 B1 | 5/2003 | Kato et al. | |
| 6,795,380 B2 | 9/2004 | Akiyama et al. | |
| 7,330,404 B2 | 2/2008 | Peng et al. | |
| 7,529,158 B2* | 5/2009 | Matsumoto et al. | 369/13.33 |
| 7,547,868 B2* | 6/2009 | Hongo et al. | 250/201.5 |
| 2003/0223316 A1* | 12/2003 | Saga et al. | 369/13.33 |
| 2004/0085862 A1* | 5/2004 | Matsumoto et al. | 369/13.33 |
| 2005/0213436 A1 | 9/2005 | Ono et al. | |
| 2005/0249451 A1 | 11/2005 | Baehr-Jones et al. | |
| 2006/0187564 A1 | 8/2006 | Sato et al. | |
| 2006/0221482 A1* | 10/2006 | Matsumoto et al. | 360/59 |
| 2007/0041119 A1* | 2/2007 | Matsumoto et al. | 360/59 |
| 2007/0286031 A1* | 12/2007 | Matsumoto | 369/13.13 |
| 2008/0002298 A1 | 1/2008 | Sluzewski | |

(Continued)

FOREIGN PATENT DOCUMENTS

JP 2004-273021 9/2004

(Continued)

OTHER PUBLICATIONS

Robert E. Rottmayer, et al. "Heat-Assisted Magnetic Recording", IEEE Transactions on Magnetics, vol. 42, No. 10, Oct. 2006, pp. 2417-2421.

(Continued)

*Primary Examiner* — Tan X Dinh
(74) *Attorney, Agent, or Firm* — Frommer Lawrence & Haug LLP

(57) ABSTRACT

A thermally-assisted magnetic recording head is provided, in which a light source with a sufficient power is disposed in the element-integration surface to improve mass-productivity. The head comprises, in an element-integration surface of a substrate: a light source; a waveguide for propagating light from the light source; and a magnetic pole for generating write field. Further, the edge along optical axis of the light source is set to be parallel with or inclined from the edge on the opposed-to-medium surface side of the element-integration surface. In the head, since the light source is disposed in the element-integration surface, the construction of the optical system can be completed in the stage of a wafer process. This construction can be relatively facilitated and simplified; thus, mass-productivity in the head manufacturing can be improved. Further, a light source with a sufficient power (cavity length) can be disposed in the element-integration surface.

19 Claims, 17 Drawing Sheets

U.S. PATENT DOCUMENTS

| | | | |
|---|---|---|---|
| 2008/0056073 A1 | 3/2008 | Shimizu | |
| 2008/0117727 A1* | 5/2008 | Matsumoto | 369/44.14 |
| 2009/0266789 A1* | 10/2009 | Shimazawa et al. | 29/603.12 |
| 2010/0195238 A1* | 8/2010 | Shimazawa et al. | 360/59 |
| 2010/0202081 A1* | 8/2010 | Shimazawa et al. | 360/59 |
| 2011/0242697 A1* | 10/2011 | Mori et al. | 369/13.33 |

FOREIGN PATENT DOCUMENTS

| | | |
|---|---|---|
| JP | 2007-200475 | 8/2007 |

OTHER PUBLICATIONS

Tetsuya Yagi, "Trend of High-Power Laser Diodes for Recordable Optical Disc Drive", The Institute of Electrical Engineers of Japan Transactions EIS, vol. 128, No. 5, 2008, pp. 692-695.

Michael Hochberg, et al., "Integrated Plasmon and Dielectric Waveguides", Optics Express, vol. 12, No. 22, Nov. 2004, pp. 5481-5486.

* cited by examiner

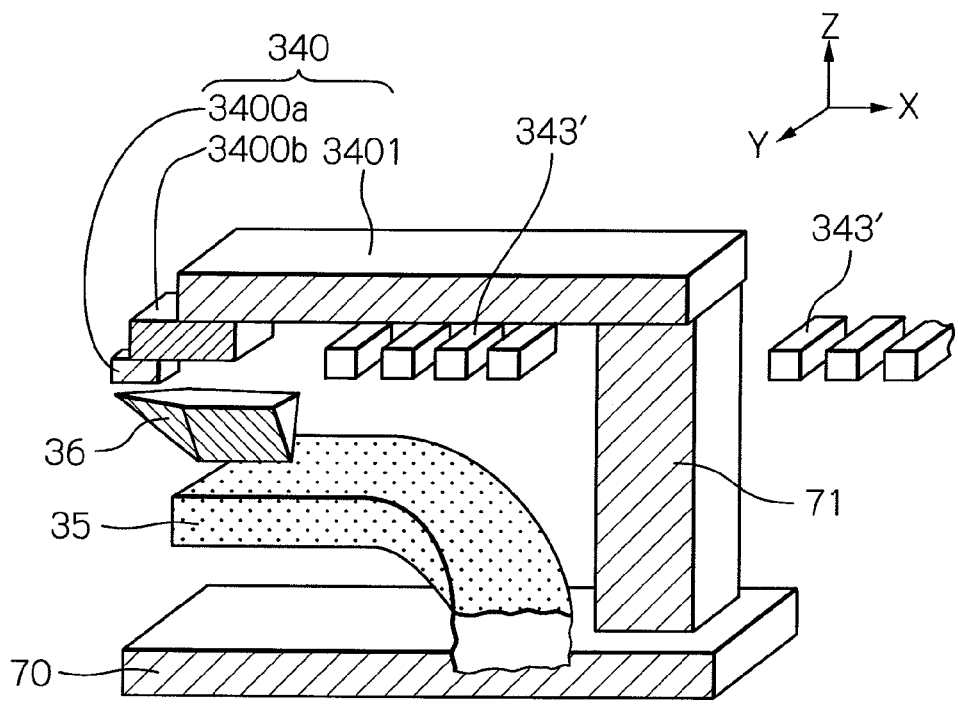
Fig. 8a1
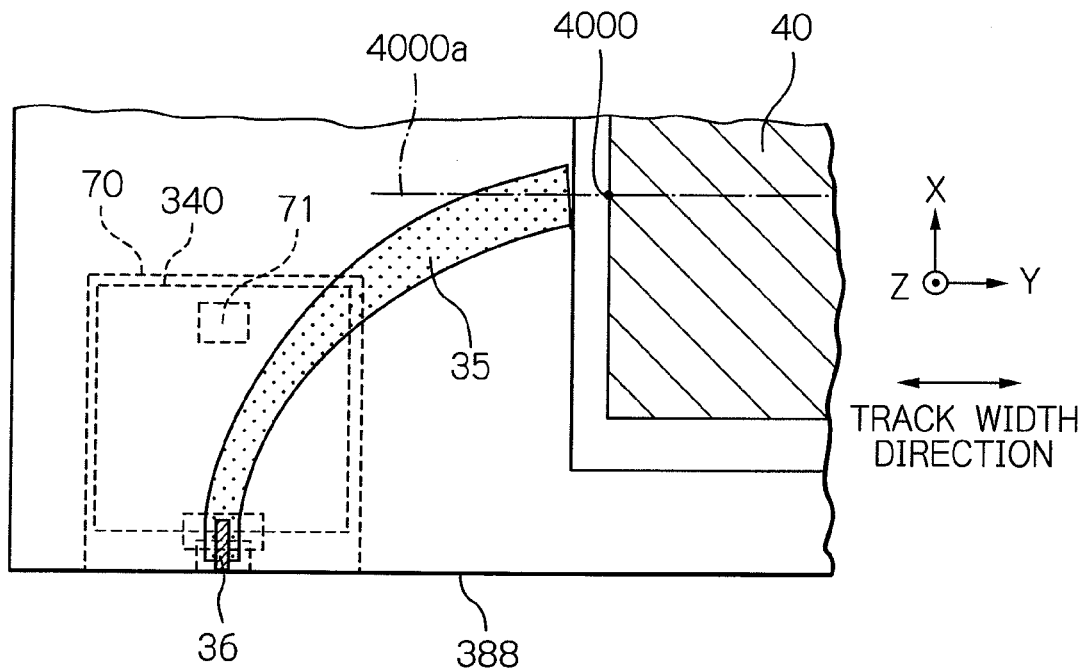
Fig. 8a2

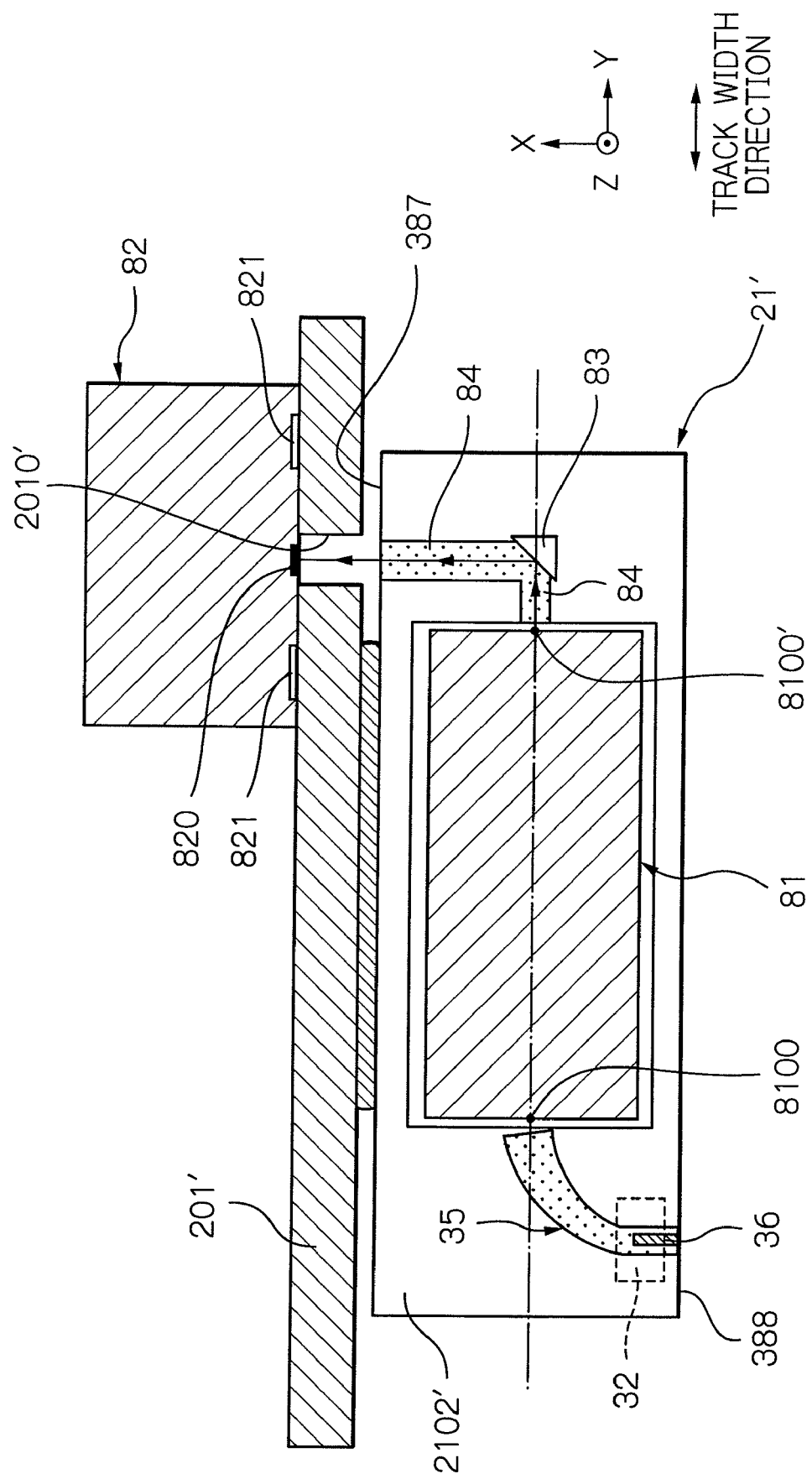

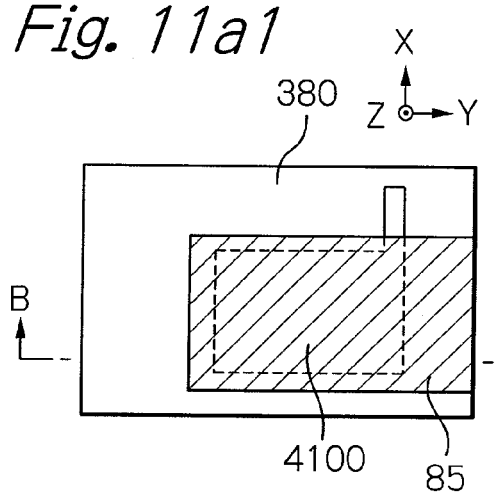
Fig. 11a1
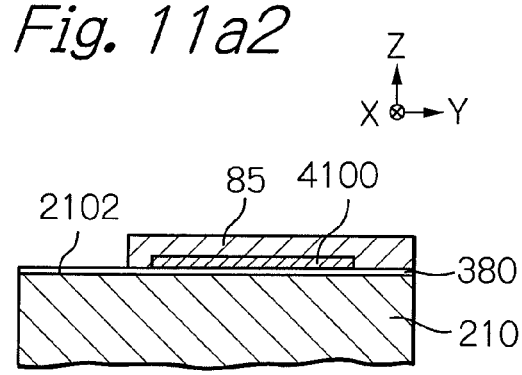
Fig. 11a2
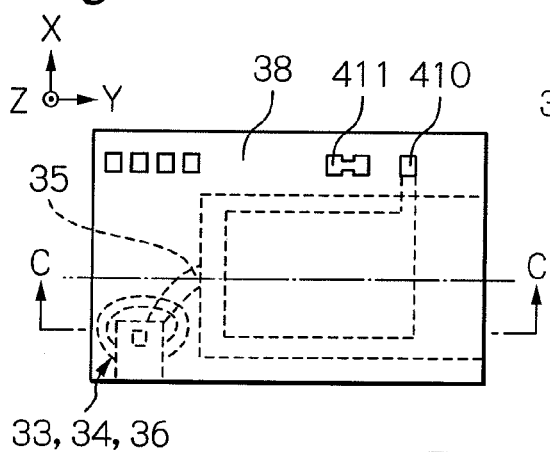
Fig. 11b1
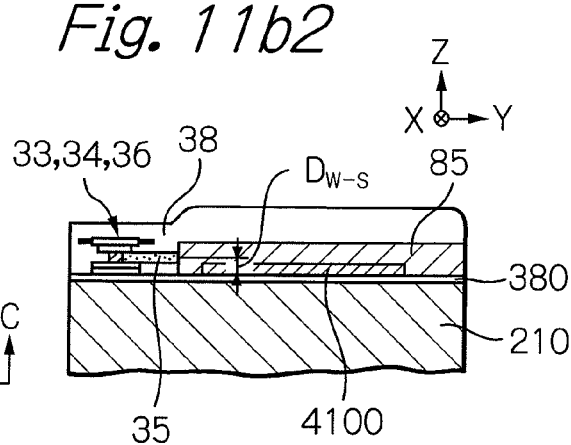
Fig. 11b2
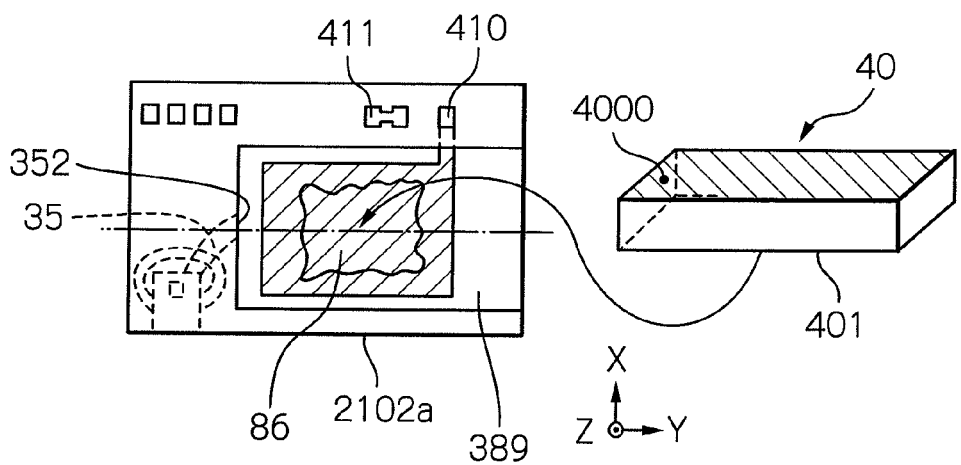
Fig. 11c

THERMALLY-ASSISTED MAGNETIC RECORDING HEAD HAVING A LIGHT SOURCE AT LEAST INCLINED FROM AN OPPOSED-TO-MEDIUM SURFACE

BACKGROUND OF THE INVENTION

1. Field of the Invention

The present invention relates to a head used for thermally-assisted magnetic recording in which a magnetic recording medium is irradiated with near-field light, thereby anisotropic magnetic field of the medium is lowered, thus data can be written. Further, the present invention relates to a head gimbal assembly (HGA) provided with the head, and to a magnetic recording apparatus provided with the HGA. Furthermore, the present invention relates to a method for manufacturing the head.

2. Description of the Related Art

As the recording density of a magnetic disk apparatus, as represented by a magnetic disk apparatus, becomes higher, further improvement has been required in the performance of a thin-film magnetic head and a magnetic recording medium. As the thin-film magnetic head, a composite-type thin-film magnetic head is widely used, which has a stacked structure of a magnetoresistive (MR) element for reading data and an electromagnetic transducer for writing data.

Whereas, the magnetic recording medium is generally a kind of discontinuous body of magnetic microparticles gathered together, and each of the magnetic microparticles has a single magnetic domain structure. Here, one record bit consists of a plurality of the magnetic microparticles. Therefore, in order to improve the recording density, it is necessary to decrease the size of the magnetic microparticles and reduce irregularity in the boundary of the record bit. However, the decrease in size of the magnetic microparticles raises a problem of degradation in thermal stability of the magnetization due to the decrease in volume.

As a measure against the thermal stability problem, it may be possible to increase the magnetic anisotropy energy Ku of the magnetic microparticles. However, the increase in energy Ku causes the increase in anisotropic magnetic field (coercive force) of the magnetic recording medium. Whereas, write field intensity of the thin-film magnetic head is limited by the amount of saturation magnetic flux density of the soft-magnetic material of which the magnetic core of the head is formed. Therefore, the head cannot write data to the magnetic recording medium when the anisotropic magnetic field of the medium exceeds the write field limit.

Recently, as a method for solving the problem of thermal stability, so-called a thermally-assisted magnetic recording technique is proposed. In the technique, a magnetic recording medium formed of a magnetic material with a large energy Ku is used so as to stabilize the magnetization; anisotropic magnetic field of the medium is reduced by applying heat to a portion of the medium, where data is to be written; just after that, writing is performed by applying write field to the heated portion.

In this thermally-assisted magnetic recording technique, there has been generally used a method in which a magnetic recording medium is heated with irradiation of light, such as near-field light, on the medium. In this case, it is important to form a very minute light spot at a desired position on the magnetic recording medium. However, from the beginning, more significant problem to be solved exists in how the light is to be supplied from a light source to the inside of a head, and specifically, where and how the light source is to be disposed.

As for the supplying of light, for example, U.S. Pat. No. 6,567,373 B1, U.S. Pat. No. 6,795,380 B2 and Japanese Patent Publication No. 2007-200475A disclose a structure in which light is guided to a desired position by using an optical fiber and a reflection means. Further, US Patent Publication No. 2006/0187564 A1 discloses a structure in which a unit having a heatsink and a laser diode is mounted on the back surface of a slider. And US Patent Publication No. 2008/0056073 A1 discloses that a structure, in which a reflection mirror is monolithically integrated into a laser diode element, is mounted on the back surface of a slider. Further, US Patent Publication No. 2005/0213436 A1 discloses a slider structure that is integrated with a semiconductor laser. And Robert E. Rottmayer et al. "Heat-Assisted Magnetic Recording" IEEE TRANSACTIONS ON MAGNETICS, Vol. 42, No. 10, p. 2417-2421 (2006) discloses a configuration in which a diffraction grating is irradiated with the light emitted from a laser unit provided within a drive apparatus.

Furthermore, US Patent Publication No. 2008/0002298 A1 and U.S. Pat. No. 5,946,281 A disclose heads in which a light source is disposed in an element-integration surface of a slider substrate. In these heads, a surface-emitting laser diode, which is easily disposed in the element-integration surface, is used as a light source, and laser light from the surface-emitting laser diode is guided to a desired position by using a diffraction optical element. Conventionally, optical devices, such as a reflection mirror, an optical fiber and a laser diode, have been mounted after a polishing operation in the wafer process of head manufacturing. On the contrary, in these heads, by forming an optical system including the diffraction optical element, the reflection mirror, etc. in the wafer process and further providing the surface-emitting laser diode in the element-integration surface also in the wafer process, the construction of the optical system is completed in the stage of the wafer process, which makes this construction comparatively facilitated and simplified and allows improvement of mass-productivity.

However, in a magnetic recording head in which the surface-emitting laser diode and the diffraction grating are disposed in the element-integration surface as described above, insufficient laser output power in the surface-emitting laser diode and degradation in function of the diffraction optical element due to fluctuation of the wavelength of the laser light is likely to lead to serious problems.

First, as for the insufficient laser output power, the amount of output of near-field light, required for attaining a recording density exceeding 1 Tbits/in$^2$ in a magnetic disk apparatus performing the thermally-assisted magnetic recording with use of near-field light, has been approximately 1 mW with a spot diameter of 40 nm or less according to the estimation by the present inventors using simulation and the like. Moreover, the light use efficiency, which we estimated for the overall optical system in an expected head structure, has been about 2%. Therefore, the output power necessary for the laser diode as a light source is estimated to be 50 mW or more. However, a surface-emitting laser diode generally has a short cavity length, and the output power is about a several mW for general use. Therefore, it is difficult for the use of the surface-emitting laser diode to meet such high output power.

Next, as for the degradation in function of the diffraction optical element due to fluctuation of the wavelength of the laser light, a diffraction optical element, such as a diffraction grating, has a function of changing a propagation direction of the light. This function is achieved by using a grating having a distance and arrangement designed based on the wavelength of incident light, and significantly affected by the wavelength of the incident light. Here, since the laser diode mounted on a head is a device formed of semiconductor, its wavelength changes according to the change of surrounding temperature. Specifically, the assumed temperature in the environment where a magnetic disk apparatus is used is, for example, about −5 to 60° C. (degrees centigrade), and accordingly the wavelength may vary, for example, by about 5-10 nm. Thus, when such a diffraction optical element is used, a serious problem may occur such that the function of the diffraction optical element is degraded by the wavelength fluctuation and then the laser light may not reach a desired position.

SUMMARY OF THE INVENTION

Therefore, an object of the present invention is to provide a thermally-assisted magnetic recording head in which a light source with a sufficient power is disposed in the element-integration surface of a slider substrate to improve mass-productivity; and to provide a head gimbal assembly (HGA) including the head and a magnetic recording apparatus including the HGA; and further to provide a method for manufacturing the head.

Another object of the present invention is to provide a thermally-assisted magnetic recording head in which a light source with a sufficient power is disposed in the element-integration surface of a slider substrate to improve mass-productivity, and nevertheless light can effectively be guided to a desired position on the opposed-to-medium surface side without using a diffraction optical element; and to provide an HGA including the head and a magnetic recording apparatus including the HGA; and further to provide a method for manufacturing the head.

Further, another object of the present invention is to provide a thermally-assisted magnetic recording head in which an edge-emitting laser diode, which can easily provide high output power at low cost, is disposed in the element-integration surface of a slider substrate, and light can effectively be guided to a desired position on the opposed-to-medium surface side; and to provide an HGA including the head and a magnetic recording apparatus including the HGA; and further to provide a method for manufacturing the head.

Some terms used in the specification will be defined before explaining the present invention. In a layered structure or an element structure formed in the element-integration surface of a slider substrate of the magnetic recording head according to the present invention, when viewed from a standard layer or element, a substrate side is defined as "lower" side, and the opposite side as an "upper" side. Further, "X-, Y- and Z-axis directions" are indicated in some figures showing embodiments of the head according to the present invention as needed. Here, Z-axis direction indicates above-described "up-and-low" direction, and +Z side corresponds to a trailing side and −Z side to a leading side. And Y-axis direction indicates a track width direction, and X-axis direction indicates a height direction.

Further, a "side surface" of a waveguide provided within the magnetic recording head is defined as an end surface other than the end surfaces perpendicular to the direction in which light propagates within the waveguide (−X direction), out of all the end surfaces surrounding the waveguide. According to the definition, an "upper surface" and a "lower surface" are one of the "side surfaces". The "side surface" is a surface on which the propagating light can be totally reflected within the waveguide corresponding to a core.

According to the present invention, a thermally-assisted magnetic recording head is provided, which comprises, in an element-integration surface of a substrate: a light source; a waveguide through which a light generated from the light source propagates; and a magnetic pole for generating write field from its end on an opposed-to-medium surface side. Further in the head, an optical axis of the light source or an edge of the light source in a direction along an optical axis is set to be parallel with an edge on the opposed-to-medium surface side of the element-integration surface, or to be inclined at a predetermined acute angle from the edge on the opposed-to-medium surface side.

In the above-described head, since the light source such as a laser diode is disposed in the element-integration surface of the substrate, the construction of the optical system in the head can be completed in the stage of a wafer process. As a result, this construction can be relatively facilitated and simplified; thus, mass-productivity in the head manufacturing can be improved. Further, the edge of the light source in the direction along the optical axis is parallel with an edge on the opposed-to-medium surface side of the element-integration surface, or is inclined at a predetermined acute angle from the edge on the opposed-to-medium surface side. Therefore, a light source with a sufficient output power (cavity length) can be disposed in the element-integration surface. In the case, the light source is preferably an edge-emitting laser diode with a cavity length of at least 300 μm (micrometers), and also preferably an edge-emitting laser diode with an output power of at least 50 mW (milliwatts).

In the thermally-assisted magnetic recording head according to the present invention, it is preferable that, in the element-integration surface, further provided is a plasmon antenna that excites surface plasmon by receiving the light propagating through the waveguide and generates near-field light from its end on the opposed-to-medium surface side. Further, the plasmon antenna is preferably opposed to an end portion on the opposed-to-medium surface side of the waveguide with a predetermined distance. Furthermore, it is preferable that the plasmon antenna comprises an edge which extends from its portion coupled with the light propagating through the waveguide in a surface plasmon mode to an near-field light generating end surface for generating near-field light; and on which surface plasmon excited by the light propagates. In the case, since near-field light is generated by using a surface plasmon mode, the temperature of the plasmon antenna is substantially reduced during radiating near-field light. This reduction of temperature allows the protrusion of the plasmon antenna toward the magnetic recording medium to be suppressed; thereby favorable thermally-assisted magnetic recording can be achieved.

Further, in the thermally-assisted magnetic recording head according to the present invention, it is preferable that a length of the edge of the light source in the direction along the optical axis is half or more the length of the edge on the opposed-to-medium surface side of the element-integration surface, and the waveguide and the magnetic pole are positioned apart from a centerline that indicates a center of the element-integration surface in a track width direction. Further in this case, it is also preferable that the center of gravity of the light source substantially resides on the centerline. This allows the thermally-assisted magnetic recording head to keep a more stable posture during flying.

Furthermore, in the thermally-assisted magnetic recording head according to the present invention, the waveguide preferably extends in a curve in such a way that a light incident on a light-receiving surface of the waveguide travels forward in a curve and reaches a portion on the opposed-to-medium surface side of the waveguide. And it is also preferable that, in the element-integration surface, further provided is a light-path changing means for changing a traveling direction of the light from the light source to a direction toward the opposed-to-medium surface.

Furthermore, in the thermally-assisted magnetic recording head comprising the plasmon antenna with the edge according to the present invention, it is also preferable that a longitudinal axis of the plasmon antenna is inclined within the element-integration surface from a direction perpendicular to the edge on the opposed-to-medium surface side of the element-integration surface toward a surface including a light-emission center of the light source. By setting an inclination angle to the plasmon antenna as described above, the overall curvature of the traveling direction of the light generated from the light source, which is required in order to couple the light with the plasmon antenna, can be made smaller by the amount of the inclination angle. As a result, the propagation loss of the light can be suppressed. Here, the angle $\theta_{PW}$ formed between a longitudinal axis of the plasmon antenna and a direction perpendicular to the edge on the opposed-to-medium surface side of the element-integration surface is 0° (degree) or more, and 30° or less.

According to the present invention, a head gimbal assembly (HGA) is further provided, which comprises: a thermally-assisted magnetic recording head as described above; and a suspension supporting the thermally-assisted magnetic recording head.

In the HGA according to the present invention, it is preferable that a photo-detector for measuring an output power of the light source to adjust the output power is provided in the suspension; the light source is an edge-emitting laser diode in which each of two end surfaces positioned opposite to each other includes a light-emission center; and further provided, in the element-integration surface, is a detection-waveguide and/or a light-path changing means for detection, used for guiding a light generated from an light-emission center on a side opposite to the waveguide to the photo-detector. Further in this case, it is preferable that a through-hole is provided in the suspension; and the photo-detector is provided on the suspension and on a side opposite to the magnetic recording head in such a way to receive, through the through-hole, the light generated from the light-emission center on the side opposite to the waveguide. This light-detecting mechanism enables the feedback adjustment of the output power of the light source. Further, With this adjustment, there can be suppressed the output change of the light source depending on its environment and the output change over time of the light source; thus the intensity of near-field light emitted from the plasmon antenna can be stabilized. As a result, proper heating of the magnetic recording layer of a magnetic disk can be secured.

According to the present invention, a magnetic recording apparatus is further provided, which comprises: at least one head gimbal assembly as described above; at least one magnetic recording medium; and a recording and light-emission control circuit for controlling light-emission operations of the light source and further controlling write operations which the thermally-assisted magnetic recording head performs to the at least one magnetic recording medium.

According to the present invention, a manufacturing method of a thermally-assisted magnetic recording head is further provided, the head comprising: a light source; a waveguide through which a light generated from the light source propagates; and a magnetic pole for generating write field from its end on an opposed-to-medium surface side, the manufacturing method comprising the step of, during a thin-film process to form the waveguide and the magnetic pole in an element-integration surface of a substrate, mounting the light source in the element-integration surface in such a way that an edge of the light source in a direction along an optical axis is parallel with an edge on the opposed-to-medium surface side of the element-integration surface, or is inclined at a predetermined acute angle from the edge on the opposed-to-medium surface side.

In the above-described manufacturing method, since the light source such as a laser diode is disposed in the element-integration surface of the substrate, the construction of the optical system in the head can be completed in the stage of a wafer process. As a result, this construction can be relatively facilitated and simplified; thus, mass-productivity in the head manufacturing can be improved. Further, a thermally-assisted magnetic recording head provided with a light source with a sufficient output power (cavity length) can be manufactured. Further in this manufacturing method, it is preferable that an overcoat layer to cover the waveguide and the magnetic pole is provided in the element-integration surface of the substrate and in a region at least except a position where the light source is to be placed, and then, the light source is placed at the position.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE DRAWINGS

FIGS. 8a1 to 8g show schematic diagrams illustrating various embodiments of the thermally-assisted magnetic recording head according to the present invention;

FIG. 9 shows a cross-sectional view illustrating another embodiment in the HGA according to the present invention;

FIGS. 11a1 to 11c show schematic diagrams explaining one embodiment of a method for mounting the laser diode in the element-integration surface of the slider substrate, in the method for manufacturing the thermally-assisted magnetic recording head according to the present invention;

DESCRIPTION OF THE PREFERRED EMBODIMENTS

Figure 1:
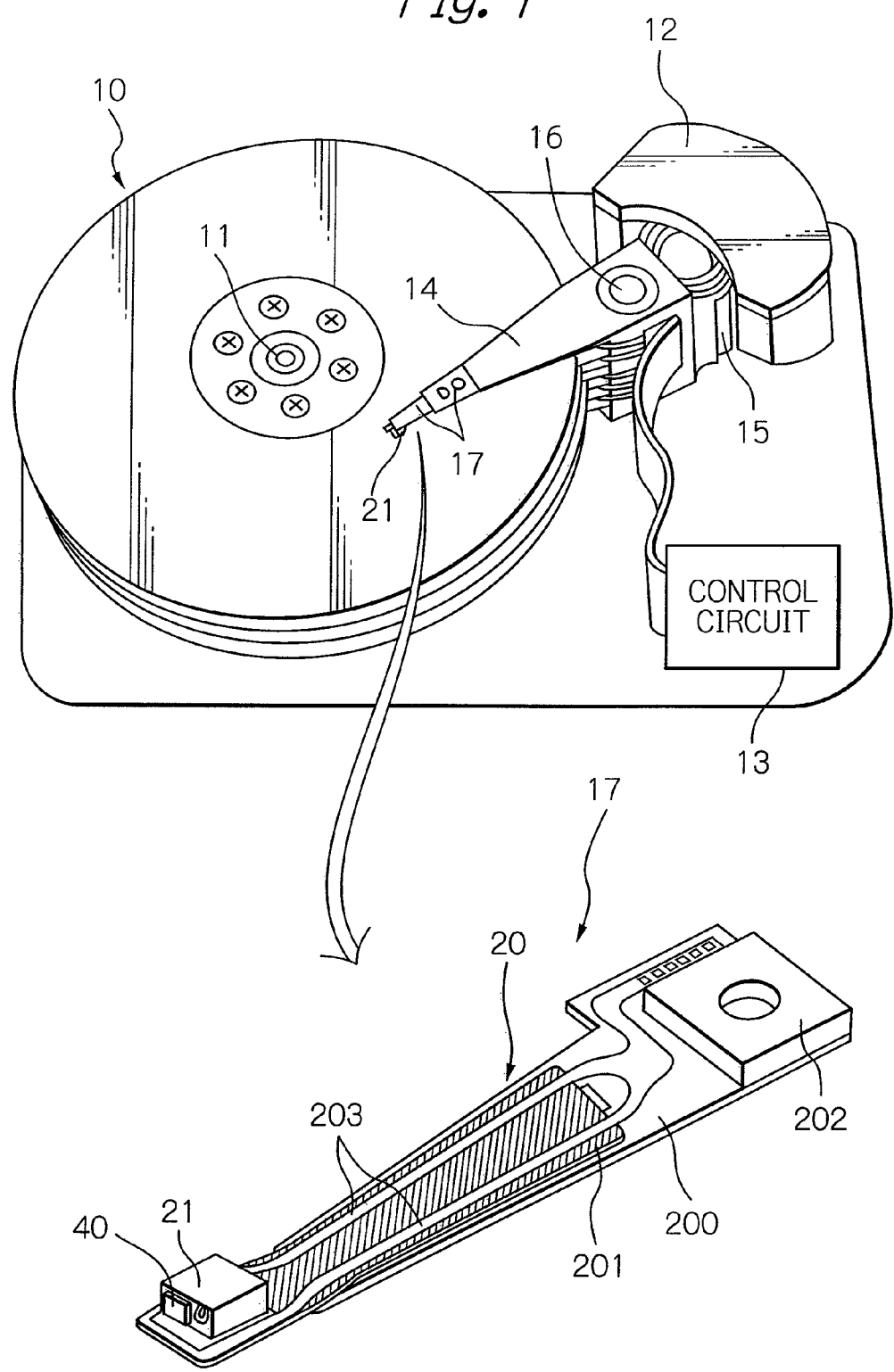
FIG. 1 shows a perspective view schematically illustrating a structure of a major part in one embodiment of a magnetic recording apparatus and an HGA according to the present invention.

FIG. 1 shows a perspective view schematically illustrating a structure of a major part in one embodiment of a magnetic recording apparatus and a head gimbal assembly (HGA) according to the present invention. Here, in the perspective view of the HGA, the side of the HGA, opposed to the surface of the magnetic recording medium, is presented as the upper side.

A magnetic disk apparatus as a magnetic recording apparatus shown in FIG. 1 includes: a plurality of magnetic disks 10 as magnetic recording media, rotating around a rotational axis of a spindle motor 11; an assembly carriage device 12 provided with a plurality of drive arms 14 thereon; a head gimbal assembly (HGA) 17 attached on the top end portion of each drive arm 14 and provided with a thermally-assisted magnetic recording head 21 as a thin-film magnetic head; and a recording/reproducing and light-emission control circuit 13 for controlling write/read operations of the thermally-assisted magnetic recording head 21 and further for controlling the emission operation of a laser diode 40 that the thermally-assisted magnetic recording head 21 includes.

The laser diode 40 is a light source for emitting laser light used for thermally-assisted magnetic recording. The laser diode 40 is of end-emitting type in the present embodiment, and is provided in the element-integration surface of a slider substrate that is a base of the thermally-assisted magnetic recording head 21. In the present embodiment, the magnetic disk 10 is designed for perpendicular magnetic recording, and has a structure in which sequentially stacked on a disk substrate is: a soft-magnetic under layer; an intermediate layer; and a magnetic recording layer (perpendicular magnetization layer). The anisotropic magnetic field (coercive force) of the magnetic recording layer is set to be a sufficiently large value for stabilizing the magnetization in room temperature. The assembly carriage device 12 is a device for positioning the thermally-assisted magnetic recording head 21 above a track formed on the magnetic recording layer of the magnetic disk 10, on which recording bits are aligned. In the apparatus, the drive arms 14 are stacked in a direction along a pivot bearing axis 16 and can be angularly swung around the axis 16 by a voice coil motor (VCM) 15. The structure of the magnetic disk apparatus according to the present invention is not limited to that described above. For instance, the number of each of magnetic disks 10, drive arms 14, HGAs 17 and thermally-assisted magnetic recording heads 21 may be one.

Referring also to FIG. 1, a suspension 20 in the HGA 17 includes: a load beam 200; a flexure 201 with elasticity fixed to the load beam 200; and a base plate 202 provided on the base portion of the load beam 200. Further, on the flexure 201, there is provided a wiring member 203 that is made up of lead conductors and connection pads electrically joined to both ends of the lead conductors. The thermally-assisted magnetic recording head 21 is fixed to the flexure 201, that is, to the top end portion of the suspension 20 so as to face the surface of each magnetic disk 10 with a predetermined spacing (flying height). Moreover, one ends of the wiring member 203 are electrically connected to terminal electrodes of the thermally-assisted magnetic recording head 21.

The structure of the suspension 20 is not limited to the above-described one. An IC chip for driving the head may be mounted midway on the suspension 20, though not shown.

Figure 2:
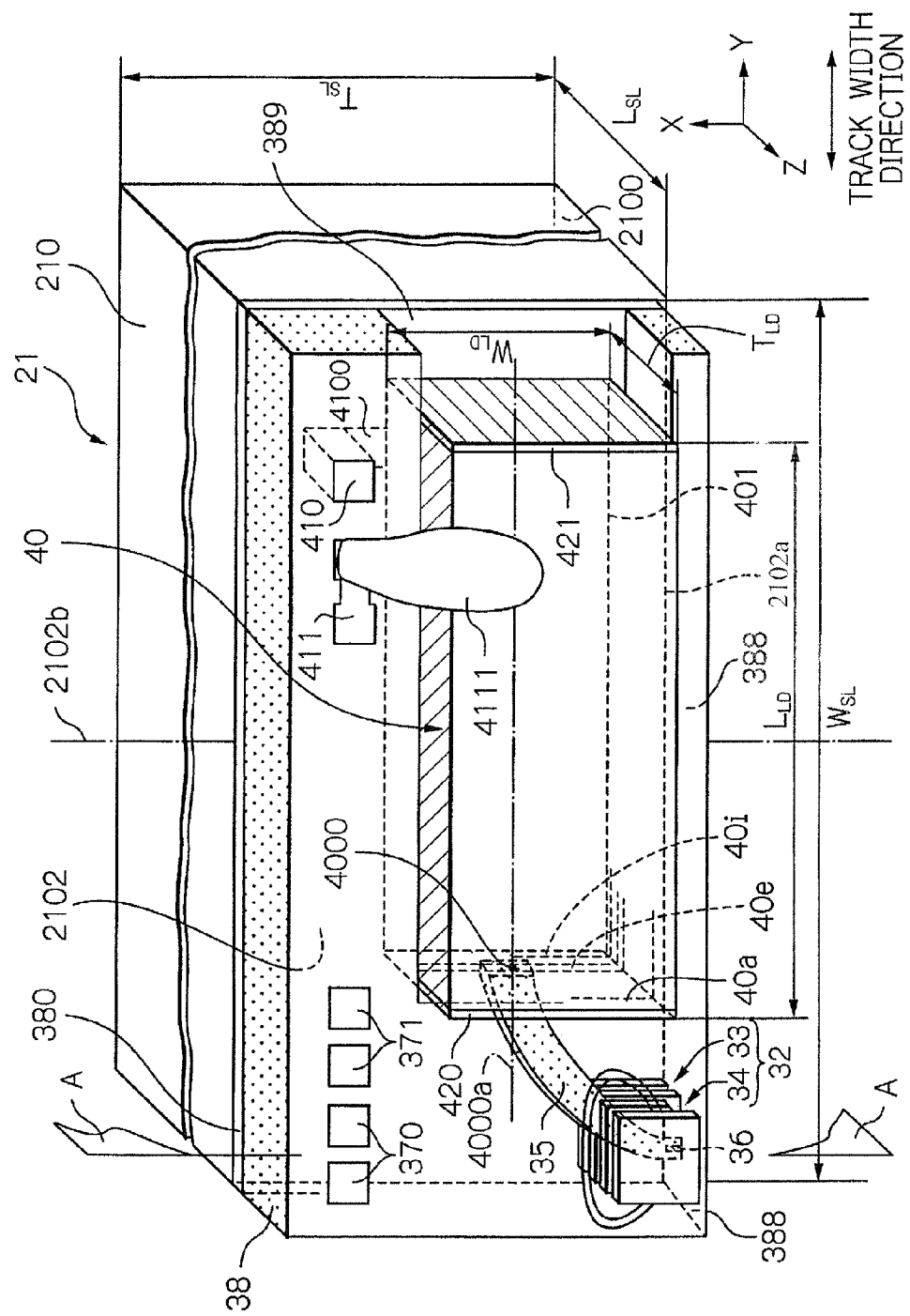
FIG. 2 shows a perspective view illustrating one embodiment of thermally-assisted magnetic recording head according to the present invention.

FIG. 2 shows a perspective view illustrating one embodiment of thermally-assisted magnetic recording head 21 according to the present invention.

As shown in FIG. 2, a thermally-assisted magnetic recording head 21 includes: a slider substrate 210 formed of, for example, AlTiC ($Al_2O_3$—TiC), and having an air bearing surface (ABS) 2100 as an opposed-to-medium surface processed so as to provide an appropriate flying height; a head element 32, a waveguide 35 and a surface plasmon antenna 36, which are formed in an element-integration surface 2102 of the slider substrate 210, the surface 2102 being perpendicular to the ABS 2100; an overcoat layer 38 formed on the element-integration surface 2102, so as to cover these elements; and a laser diode 40 of edge-emitting type, disposed on the element-integration surface 2102. The head end surface 388, which is a surface of the overcoat layer 38 opposed to the medium, and the ABS 2100 constitute the whole opposed-to-medium surface of the thermally-assisted magnetic recording head 21.

The head element 32 is constituted of a magnetoresistive (MR) element 33 for reading data from the magnetic disk and an electromagnetic transducer 34 for writing data to the magnetic disk. The waveguide 35 is an optical path for guiding laser light, which is emitted from the laser diode 40, to the head end surface 388 side. Further, the surface plasmon antenna 36 converts the laser light (waveguide light) propagating through the waveguide 35 into near-field light. Here, a part of the waveguide 35, the surface plasmon antenna 36, and a buffering portion 50 described later constitute a near-field light generating element.

Furthermore, the thermally-assisted magnetic recording head 21 includes: a pair of terminal electrodes 370 exposed in the upper surface of the overcoat layer 38 and electrically connected to the MR element 33; a pair of terminal electrodes 371 also exposed in the upper surface of the overcoat layer 38 and electrically connected to the electromagnetic transducer 34; and a pair of terminal electrodes 410 and 411 also exposed in the upper surface of the overcoat layer 38 and electrically connected to the laser diode 40. These terminal electrodes 370, 371, 410 and 411 are electrically connected to the connection pads of the wiring member 203 provided on the flexure 201 (FIG. 1).

One ends of the MR element 33, the electromagnetic transducer 34, and the surface plasmon antenna 36 reach the head end surface 388 as an opposed-to-medium surface. During actual write and read operations, the thermally-assisted magnetic recording head 21 aerodynamically flies above the surface of the rotating magnetic disk with a predetermined flying height. Thus, the ends of the MR element 33 and electromagnetic transducer 34 face the surface of the magnetic recording layer of the magnetic disk with an appropriate magnetic spacing. Then, the MR element 33 reads data by sensing signal magnetic field from the magnetic recording layer, and the electromagnetic transducer 34 writes data by applying signal magnetic field to the magnetic recording layer. When writing data, laser light is emitted from the laser diode 40 disposed in the element-integration surface 2102 of the head 21 and propagates through the waveguide 35. Then, the laser light (waveguide light) is coupled with the surface plasmon antenna 36 in a surface plasmon mode, as described in detail later. As a result, surface plasmon is excited on the surface plasmon antenna 36. The surface plasmon propagates on a propagation edge provided in the surface plasmon antenna 36, which will be detailed later, toward the head end surface 388, which causes near-field light to be generated from the end on the head end surface 388 side of the surface plasmon antenna 36. The generated near-field light reaches the surface of the magnetic disk, and heats a portion of the magnetic recording layer of the disk. As a result, the anisotropic magnetic field (coercive force) of the portion is decreased to a value that enables writing; thus the thermally-assisted magnetic recording can be accomplished.

Also according to FIG. 2, the slider substrate 210 is preferably so-called a femto slider in which the thickness $T_{SL}$ (in X-axis direction) is 230 μm (micrometers), the width $W_{SL}$ in the track width direction (Y-axis direction) is 700 μm, and the length $L_{SL}$ (in Z-axis direction) is 850 μm. The femto slider is generally used as a substrate for thin-film magnetic heads capable of high-density recording, and has the smallest standardized size of all the sliders currently on the market. In this case, the element-integration surface 2102 of the slider substrate 210 is a region with the area of 230 μm ($T_{SL}$)×700 μm ($W_{SL}$).

The laser diode 40 is mounted in the element-integration surface 2102 with such a small area. As the laser diode 40, InP base, GaAs base or GaN base diodes can be utilized, which are usually used for communication, optical disk storage, or material analysis. The wavelength $\lambda_L$ of the emitted laser light may be, for example, in the range of approximately 375 nm (nanometers) to 1.7 μm. For example, a laser diode of InGaAsP/InP quaternary mixed crystal can be used, in which possible wavelength region is set to be from 1.2 to 1.67 μm. The laser diode 40 has a multilayered structure including an n-electrode 40a, an active layer 40e, and a p-electrode 40i. On the front and rear cleaved surfaces of the multilayered structure, respectively formed are reflective layers 420 and 421 for exciting the oscillation by total reflection. Further, the reflective layer 420 has an opening in the position of the active layer 40e including a light-emission center 4000. Here, the optical axis of the laser diode 40 is an axis 4000a extending through the active layer 40e and the light-emission center 4000, in the direction perpendicular to the reflective layer 420. Further, in the present embodiment, the laser diode 40 is fixed to the slider substrate 210 in such a way that the p-electrode 40i becomes on the side of a base layer 380 formed on the element-integration surface 2102, that is, the p-electrode 40i becomes the bottom. The laser diode 40 is located in the concave portion 389 where the overcoat layer 38 does not exist, and the p-electrode 40i is electrically joined to a lead electrode 4100 of the terminal electrode 410, the lead electrode 4100 being formed on the base layer 380.

The width $W_{LD}$ of the laser diode 40 is, for example, in the range from 150 to 250 μm. The length $L_{LD}$ of the laser diode 40 corresponds approximately to the cavity length that is a distance between the reflective layers 420 and 421, and is, for example, 600 μm. To obtain sufficient output power, this length $L_{LD}$ is preferably 300 μm or more. Further, the height $T_{LD}$ of the laser diode 40 is, for example, in the range approximately from 60 to 200 μm.

The laser diode 40 is disposed in such a way that an edge 401 in the direction along the optical axis 4000a within the bottom of the laser diode 40 (an edge in the longitudinal direction of the laser diode 40) is parallel with an edge 2102a on the head end surface 388 side of the element-integration surface 2102, or is inclined at a predetermined acute angle from the edge 2102a within the element-integration surface 2102. This means that the optical axis 4000a is set to be parallel with the edge 2102a or to be inclined at a predetermined acute angle from the edge 2102a within the element-integration surface 2102. In the present embodiment, the edge 401 (in the longitudinal direction) and the optical axis 4000a are parallel with the edge 2102a of the element-integration surface 2102 in the track width direction (in the Y-axis direction). Here, the edge 401 has a length $L_{LD}$ corresponding to the cavity length. On the other hand, when the slider substrate 210 is a femto slider, the length of the edge 2102a equals to the width $W_{SL}$, which is 700 μm. Accordingly, even when the edge 401 has a length $L_{LD}$ of, for example, 600 μm, the laser diode 40 does not protrude beyond the element-integration surface 2102, and can be disposed in the element-integration surface 2102 without overlapping with the head element 32. In the present embodiment, the installation of the laser diode 40 corresponds to "horizontal mounting" in which the edge of the laser diode 40 in the longitudinal direction is directed along the track width direction (Y-axis direction).

The length $L_{LD}$ of the edge 401 corresponds to the cavity length of the laser diode 40, and is preferably set to be at least 300 μm for obtaining sufficient laser output power. Therefore, it is understood that the laser diode 40 having the sufficient output power can be disposed in the element-integration surface 2102 without protruding beyond the surface 2102 and without overlapping with the head element 32, by setting the edge 401 and the edge 2102a parallel with each other. Here, one of important problems to be solved in the setting of the laser diode 40 lies in cooling of the laser diode 40 during light-emitting operation. In the present embodiment, the laser diode 40 is mounted on the slider substrate 210 without protruding beyond the element-integration surface 2102, which allows the slider substrate 210 to function as a heatsink that receives heat from the entire bottom surface of the laser diode 40 and effectively suppresses excessive temperature rise of the laser diode 40.

Here, considering on the necessitated laser output power, the amount of output of near-field light, required for attaining a recording density exceeding 1 Tbits/in$^2$ in a magnetic disk apparatus performing the thermally-assisted magnetic recording with use of near-field light, has been approximately 1 mW (milliwatt) with a spot diameter of 40 nm or less according to the estimation by the present inventors using simulation and the like. Moreover, the light use efficiency, which we estimated for the overall optical system, has been about 2%. Therefore, the output power necessary for the laser diode 40 is estimated to be 50 mW or more. Thus, it is understood that the output power of the laser diode 40 is preferably at least 50 mW. As disclosed in Tetsuya Yagi, "Trend of High-Power Laser Diodes for Recordable Optical Disc Drive", The Institute of Electrical Engineers of Japan TRANSACTIONS EIS, Vol. 128, No. 5, p. 692-695 (2008), in order to obtain stable and high output power in a laser diode, it is necessary to avoid deviation from linearity (kink) in an operation current vs. laser output characteristic curve, and improve temperature characteristic. For this reason, it is necessary to set the cavity length sufficiently large. In fact, it has been known that the cavity length has to be at least 300 μm for obtaining stable output power of at least 50 mW.

In the present embodiment, the length $L_{LD}$ (600 μm) of the edge 401 of the laser diode 40 is half or more the length (700 μm) of the edge 2102a of the element-integration surface 2102. While, the head element 32, the waveguide 35 and the surface plasmon antenna 36 are positioned apart from a centerline 2102b that indicates the center of the element-integration surface 2102 in the track width direction (Y-axis direction). Here, especially, it is also preferable to use a side-element structure in which the head element 32 is disposed at the end portion of the element-integration surface 2102 in the track width direction (Y-axis direction). By arranging the laser diode 40, the head element 32 and the waveguide 35 in the above-described manner, in the case that the slider substrate 210 is a femto-slider, there can be used the high-output laser diode 40 having the length $L_{LD}$, which corresponds to the cavity length, of 350 μm or more, and, for example, 630 μm or less. Moreover, it is also preferable in this arrangement that the center of gravity of the laser diode 40 substantially resides on the centerline 2102b. This allows the thermally-assisted magnetic recording head 21 to keep a more stable posture during flying. Here, the head element 32 and the surface plasmon antenna 36 may be placed on the centerline 2102b. In this case, the laser diode 40 having the length $L_{LD}$ of the edge 401 of less than 350 μm is used accordingly.

Referring also to FIG. 2, a terminal electrode 410 is electrically connected to the p-electrode 40i, which is the bottom surface of the laser diode 40, with a lead electrode 4100. Further, a terminal electrode 411 is electrically connected to the n-electrode 40a, which is the upper surface of the laser diode 40. Here, the terminal electrode 411 and the n-electrode 40a may be connected to each other with solder 4111 by using a solder-ball bonding (SBB) method. There may be used as the solder 4111 metal a material including, for example, Sn, Pb, Ag, Cu, Zn, Al, Bi, In or the like. These terminal electrodes 410 and 411 are electrically connected to connection pads of the wiring member 203 provided on the flexure 201 (FIG. 1). When a predetermined voltage is applied to the laser diode 40 through both electrodes 410 and 411, laser light is emitted from the light-emission center 4000 of the laser diode 40. Here, in the head configuration shown in FIG. 2, it is preferable that the oscillation direction of the electric field of laser light emitted from the laser diode 40 is perpendicular to a layer surface of the active layer 40e (in Z-axis direction). That is, it is preferable that the laser light emitted from the laser diode 40 has TM-mode polarization. This enables the waveguide light propagating through the waveguide 35 to be coupled with the surface plasmon antenna 36 in a surface plasmon mode, as described later.

Further, an electric source provided within the magnetic disk apparatus can be used for driving the laser diode 40. In fact, the magnetic disk apparatus usually has an electric source with applying voltage of, for example, approximately 2 to 5 V, which is sufficient for the laser oscillation. The laser diode 40 preferably has a laser output power of at least 50 mW as described above; even in the case that the amount of electric power consumption of the laser diode 40 is, for example, in the neighborhood of one hundred mW, the amount can be covered sufficiently by the electric source provided within the magnetic disk apparatus. Further, the laser diode 40 and terminal electrodes 410 and 411 are not limited to the above-described embodiment. For example, as for the setting of the laser diode 40, there can be other embodiments than the above-described "horizontal mounting", which will be explained later. Further, the terminal electrode 411 can also be connected with the n-electrode 40a by using, not the SBB, but a wire bonding method. Furthermore, the laser diode 40 can be fixed to the slider substrate 210 with the n-electrode 40a as the bottom.

Figure 3:
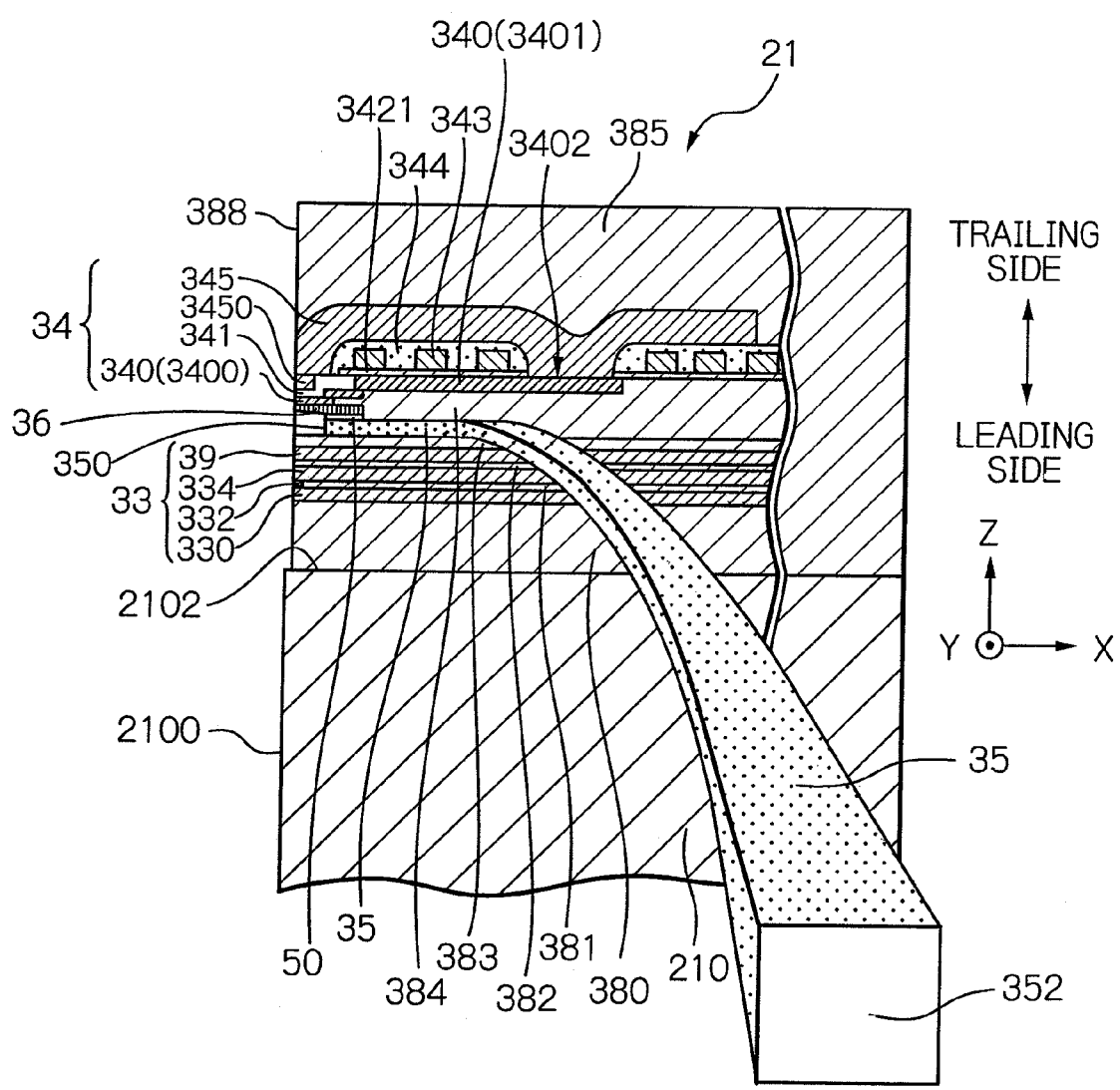
FIG. 3 shows a cross-sectional view taken by plane A in FIG. 2, schematically illustrating the configuration of the head element and its vicinity in the thermally-assisted magnetic recording head.

FIG. 3 shows a cross-sectional view taken by plane A in FIG. 2, schematically illustrating the configuration of the head element 32 and its vicinity in the thermally-assisted magnetic recording head 21.

As shown in FIG. 3, the MR element 33 is formed on an insulating layer 380 made of insulating material such as $Al_2O_3$ (alumina) or $SiO_2$ and stacked on the element-integration surface 2102, and includes: an MR multilayer 332; and a lower shield layer 330 and an upper shield layer 334 which sandwich the MR multilayer 332 and an insulating layer 381 therebetween. The upper and lower shield layers 334 and 330 prevent the MR multilayer 332 from receiving external magnetic field as a noise. The upper and lower shield layers 334 and 330 are magnetic layers formed of a soft-magnetic material such as NiFe (Permalloy), FeSiAl (Sendust), CoFeNi, CoFe, FeN, FeZrN or CoZrTaCr, or the multilayer of at least two of these materials, with thickness of approximately 0.5 to 3 μm, by using a frame plating method or a sputtering method.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that are electrically connected to the MR multilayer 332.

Referring also to FIG. 3, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of insulating material such as $Al_2O_3$ (alumina), and acts as a magnetic path for converging and guiding magnetic flux toward the magnetic recording layer (perpendicular magnetization layer) of the magnetic disk, the magnetic flux being excited by write current flowing through the write coil layer 343. The main magnetic pole layer 340 has a structure in which a main magnetic pole 3400 and a main pole body 3401 are sequentially stacked. The main magnetic pole 3400 includes: a first main pole portion 3400a reaching the head end surface 388 and having a small width $W_P$ (FIG. 6) in the track width direction; and a second main pole portion 3400b located on the first main pole portion 3400a and at the rear (+X side) of the portion 3400a. The small width $W_P$ of the first main pole portion 3400a enables a fine write magnetic field to be generated, so that the track width can be set to be a very small value adequate for higher recording density. The main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the first main pole portion 3400a is, for example, in the range of approximately 0.1 to 0.8 μM.

The gap layer 341 forms a gap provided for separating the main magnetic pole layer 340 from the write shield layer 345 in the region near the head end surface 388. The gap layer 341 is formed, for example, of non-magnetic insulating material such as $Al_2O_3$ (alumina), $SiO_2$ (silicon dioxide), AlN (aluminum nitride) or diamond-like carbon (DLC), or formed of a non-magnetic conductive material such as Ru. The thickness of the gap layer 341 determines the distance between the main magnetic pole layer 340 and the write shield layer 345, and is, for example, in the range of approximately 0.01 to 0.5 µm.

The write coil layer 343 is formed on an insulating layer 3421 made of insulating material such as Al$_2$O$_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345. The write coil layer 343 has a monolayer structure in the present embodiment; however, may have a two or more layered structure or a helical coil shape. Further, the number of turns of the write coil layer 343 is not limited to that shown in FIG. 3, and may be, for example, in the range from two to seven.

The write shield layer 345 reaches the head end surface 388, and acts as a magnetic path for the magnetic flux returning from a soft-magnetic under layer that is provided under the magnetic recording layer (perpendicular magnetization layer) of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head end surface 388, and is provided for receiving the magnetic flux spreading from the main magnetic pole layer 340. The trailing shield 3450 has a width in the track width direction larger than the width of the main pole body 3401 as well as the first main pole portion 3400a. This trailing shield 3450 causes the magnetic field gradient between the end portion of the trailing shield 3450 and the first main pole portion 3400a to become steeper. As a result, jitter of signal output becomes smaller, and therefore, error rates during read operations can be reduced. The write shield layer 345 is formed of a soft-magnetic material; especially, the trailing shield 3450 is preferably formed of a material with high saturation magnetic flux density such as NiFe (Permalloy) or an iron alloy as the main magnetic pole 3400 is formed of.

Referring also to FIG. 3, a part on the head end surface 388 side of the waveguide 35 and the surface plasmon antenna 36 are provided between the MR element 33 and the electromagnetic transducer 34, and constitute a near-field light generating element as an optical system within the thermally-assisted magnetic recording head 21. Here, the waveguide 35 extends in a curve from a rear end surface 352, that is a light-receiving surface to receive laser light emitted from the laser diode 40 also disposed in the element-integration surface 2102, to the end surface 350 on the head end surface 388 side. As a result, the laser light (waveguide light) that enters inside from the rear end surface 352 and propagates through the waveguide 35 is curved in traveling direction, and reaches a portion on the head end surface 388 side of the waveguide 35. Further, a portion of the upper surface (side surface) of the waveguide 35 on the head end surface 388 side is opposed to a portion of the lower surface (including a propagation edge 360 (FIG. 5)) of the surface plasmon antenna 36 with a predetermined distance, and the sandwiched portion between these portions constitutes a buffering portion 50 having a refractive index lower than that of the waveguide 35. The buffering portion 50 acts for coupling the waveguide light that propagates through the waveguide 35 with the surface plasmon antenna 36 in a surface plasmon mode. Here, the buffering portion 50 may be a portion of an insulating layer 384 that is a part of the overcoat layer 38, or a new layer provided other than the insulating layer 384. A detailed description of the waveguide 35, the surface plasmon antenna 36, and the buffering portion 50 will be given later with reference to FIG. 5.

Alternatively, a plasmon antenna made of a metal plate piece can be used, instead of the surface plasmon antenna 36, to generate near-field light by being irradiated with the waveguide light from the waveguide 35. Various other embodiments of surface plasmon antenna or plasmon antenna could be used. In any case, the laser light emitted from the laser diode 40 disposed in the element-integration surface 2102 can be coupled with a surface plasmon antenna or a plasmon antenna by using the waveguide 35 extending in a curve. Further, another alternative without using near-field light generating elements can be applied, in which the magnetic recording layer of a magnetic disk is irradiated directly with laser light emitted from the waveguide 35 to heat a portion of the magnetic recording layer.

Further, in the present embodiment, an inter-element shield layer 39 is preferably provided between the MR element 33 and the electromagnetic transducer 34 (waveguide 35), sandwiched by the insulating layers 382 and 383. The inter-element shield layer 39 plays a role for shielding the MR element 33 from the magnetic field generated from the electromagnetic transducer 34, and may be formed of a soft-magnetic material. Further, a backing coil portion may be provided between the inter-element shield layer 39 and the waveguide 35, though not shown in the figure. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk. Here, the insulating layers 381, 382, 383, 384 and 385 constitute the overcoat layer 38.

Figure 4:
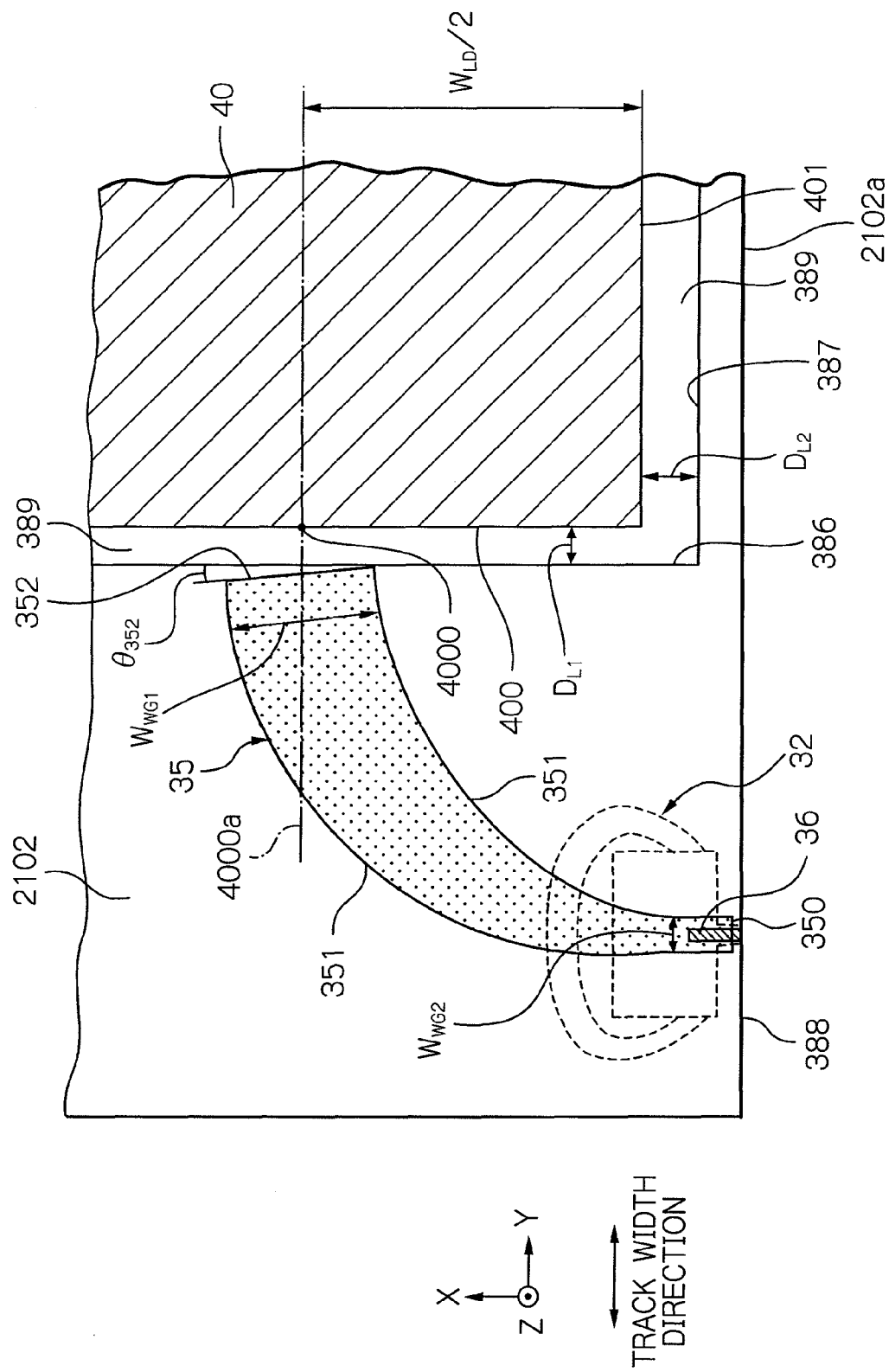
FIG. 4 shows a plan view schematically illustrating the configuration of the waveguide, the surface plasmon antenna, the head element and the laser diode that are arranged in the element-integration surface.

FIG. 4 shows a plan view schematically illustrating the configuration of the waveguide 35, the surface plasmon antenna 36, the head element 32 and the laser diode 40 that are arranged in the element-integration surface 2102. In the figure, the head element 32 is depicted in broken lines for easy viewing of the figure.

As shown in FIG. 4, the waveguide 35 extends in a curve from the light-receiving end surface 352, which receives the laser light emitted from the light-emission center 4000 of the laser diode 40, to the end surface 350 on the head end surface 388 side. As a result, the laser light (waveguide light) incident on the light-receiving end surface 352 and propagating through the waveguide 35 travels forward in a curve, and reaches a portion facing the surface plasmon antenna 36. On this occasion, while total reflection occurs on the side surfaces, including the curved surface portions, of the waveguide 35, the waveguide light propagates inside the waveguide 35 with the traveling direction curved. In the present embodiment, the portion of the waveguide 35 near the head end surface 388 and the surface plasmon antenna 36 extend in the direction perpendicular to the edge 2102a of the element-integration surface 2102 (to head end surface 388) (That is, $\theta_{PW}=0°$ in FIG. 8d). While, the light-receiving end surface 352 of the waveguide 35 is preferably inclined at a predetermined acute angle $\theta_{352}$ from the end surface 400 including the light-emission center 4000 of the laser diode 40. The angle $\theta_{352}$ is, for example, approximately 4°. This inclination prevents the light-returning phenomenon in which the laser light reflected off the light-receiving end surface 352 returns to the light-emission center 4000. Thus, since the waveguide 35 extends in a curve in the element-integration surface 2102, even when the laser diode 40 is placed in the element-integration surface 2102 and further the optical axis 4000a is directed toward the track width direction (Y-axis direction), the waveguide light can be propagated up to the vicinity of the head end surface 388 and coupled with the surface plasmon antenna 36.

A width $W_{WG1}$ in the vicinity of the light-receiving end surface 352 of the waveguide 35 may be, for example, approximately 0.5 to 200 µm. The width of the waveguide 35 becomes gradually thinner along the travelling direction of the waveguide light. That is, opposed side surfaces 351 become gradually closer to each other along the travelling direction of the waveguide light. As a result, a width $W_{WG2}$ in the vicinity of the end surface 350 in the track width direction (Y-axis direction) can be made to a smaller value than the width $W_{WG1}$, for example, approximately 0.3 to 100 µm. As described above, in the thermally-assisted magnetic recording head 21 according to the present invention, while the laser diode 40, which has a sufficiently large output power for thermally assisting, is disposed in the element-integration surface 2102 of the slider substrate 210 to achieve improvement of mass-productivity, a diffraction optical element such as a diffraction grating or the like is not necessitated to be used for directing the laser light toward the head end surface 388. As a result, even when the wavelength fluctuation of the laser light due to the change of surrounding temperature occurs, the laser light can be securely transmitted to the desired position in the vicinity of the head end surface 388.

The laser diode 40 can be provided in a concave portion 389 formed on the element-integration surface 2102, where the overcoat layer 38 does not exist. The setting method including formation of the concave portion 389 will be explained in detail later. The laser diode 40 is positioned apart from wall surfaces 386 and 387 surrounding the concave portion 389 of the overcoat layer by predetermined distances $D_{L1}$ and $D_{L2}$, respectively, so as to be aligned relative to the waveguide 35 and to avoid receiving unnecessary stress in the setting procedure. The distances $D_{L1}$ and $D_{L2}$ may be set to be, for example, 2±1 µm and 6±1 µm, respectively.

Figure 5:
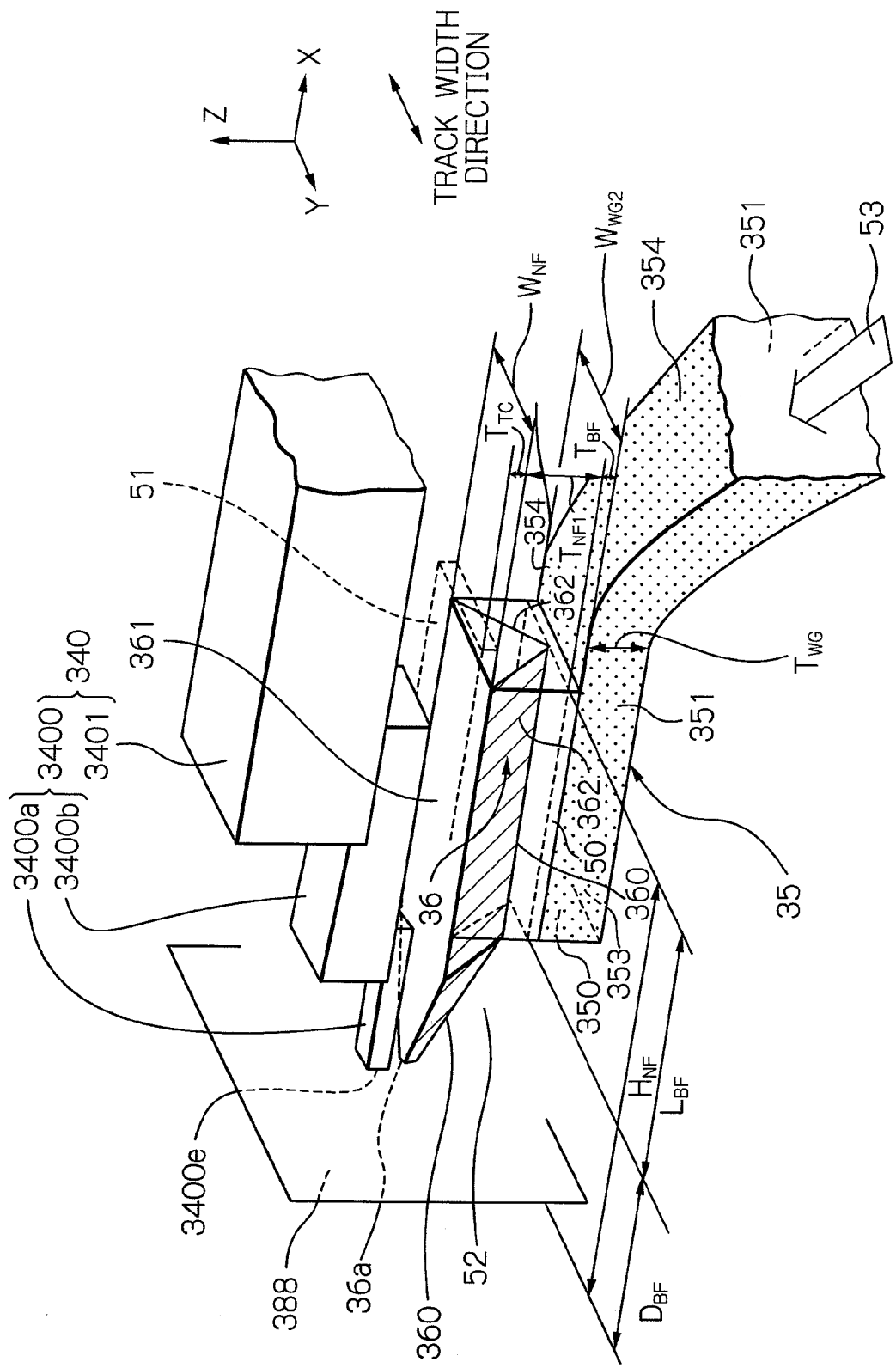
FIG. 5 shows a perspective view schematically illustrating the configuration of the waveguide, the surface plasmon antenna and the main magnetic pole layer.

FIG. 5 shows a perspective view schematically illustrating the configuration of the waveguide 35, the surface plasmon antenna 36 and the main magnetic pole layer 340. In the figure, the head end surface 388 is positioned at the left side, the surface 388 including positions where write field and near-field light are emitted toward the magnetic recording medium.

As shown in FIG. 5, the configuration includes the waveguide 35 for propagating laser light 53 used for generating near-field light, and the surface plasmon antenna 36 that has a propagation edge 360 as an edge on which surface plasmon excited by the laser light 53 propagates. Further, the buffering portion 50 is a portion sandwiched between a portion of the side surface 354 of the waveguide 35 and a portion of the lower surface 362 including the propagation edge 360 of the surface plasmon antenna 36, the portions being opposed to each other. That is, a portion of the propagation edge 360 is covered with the buffering portion 50. The buffering portion 50 acts for coupling the laser light 53 with the surface plasmon antenna 36 in a surface plasmon mode. Here, side surfaces of the waveguide 35 are defined as, out of end surfaces surrounding the waveguide 35, end surfaces other than the end surface 350 on the head end surface 388 side and the rear end surface 352 on the opposite side, the end surfaces 350 and 352 being perpendicular to the propagating direction (−X direction) of the laser light 53. The curved surfaces 351 are also side surfaces. These side surfaces serve as surfaces on which the propagating laser light 53 can be totally reflected in the waveguide 35 that corresponds to a core. In the present embodiment, the side surface 354 of the waveguide 35, a portion of which is in surface contact with the buffering portion 50, is the upper surface of the waveguide 35. And, the buffering portion 50 may be a portion of the overcoat layer 38 (FIG. 2), or may be provided as a new layer other than the overcoat layer 38.

Further, the surface plasmon antenna 36 has a near-field light generating end surface 36a reaching the head end surface 388. The near-field light generating end surface 36a is close to an end surface 3400e of the main magnetic pole 3400, the surface 3400e reaching the head end surface 388. Moreover, the propagation edge 360 extends from its portion covered with the buffering portion 50 to the near-field light generating end surface 36a, the covered portion being coupled with the laser light 53 in a surface plasmon mode. Thus, the propagation edge 360 acts for propagating the surface plasmon excited by the laser light 53 to the near-field light generating end surface 36a. A portion on the head end surface 388 side of the propagation edge 360 has a straight or curved line shape extending so as to become closer to the end surface 361 on the side opposite to the edge 360 of the surface plasmon antenna 36 toward the near-field light generating end surface 36a. The propagation edge 360 can be made rounded to prevent surface plasmon from running off from the edge 360. The curvature radius of the rounded edge may be, for example, in the range of 5 to 500 nm.

Further, in the present embodiment, the surface plasmon antenna 36 tapers toward the near-field light generating end surface 36a in the height direction (Z-axis direction) near the head end surface 388. And the surface plasmon antenna 36 has a cross-section taken by YZ plane with a triangular shape, especially, has a predetermined triangular shape in the vicinity of the head end surface 388. Accordingly, in the present embodiment, the near-field light generating end surface 36a has a triangular shape (FIG. 6) in which one apex is the end of the propagation edge 360 reaching the end surface 36a. Thus, surface plasmon propagating on the propagation edge 360 reaches the near-field light generating end surface 36a, and then causes near-field light to be generated from the end surface 36a.

The waveguide 35 and the buffering portion 50 are provided in −Z direction side, that is, in the side opposite to the main magnetic pole 3400 in relation to the surface plasmon antenna 36. As a result, the propagation edge 360, which is covered with the buffering portion 50, is also positioned on the side opposite to the main magnetic pole 3400 in the surface plasmon antenna 36. By applying such a configuration, even when a distance between the end surface 3400e generating write field of the main magnetic pole 3400 and the end surface 36a emitting near-field light is sufficiently small, preferably 100 nm or less, the waveguide 35 can be sufficiently separated apart from the main magnetic pole 3400 and the main pole body 3401. As a result, there can be avoided such a situation in which a part of the laser light 53 is absorbed into the main magnetic pole 3400 and main pole body 3401 made of metal and the amount of light to be converted into the near-field light is reduced. Further, the waveguide 35 can have a cross-section with a rectangular, square or trapezoidal shape at the portion opposed to the surface plasmon antenna 36 through the buffering portion 50. The width $W_{WG2}$ in the track width direction (Y-axis direction) of a portion on the end surface 350 side of the waveguide 35 may be, for example, in the range approximately from 0.3 to 100 µm. And the thickness $T_{WG}$ (in Z-axis direction) may be, for example, in the range approximately from 0.1 to 4 µm.

Further, the side surfaces of the waveguide 35: the upper surface 354, the lower surface 353, and both the side surfaces 351 in the track width direction (Y-axis direction) have a contact with the overcoat layer 38 (FIG. 2) except the portion having a surface contact with the buffering portion 50. Here, the waveguide 35 is formed of a material with refractive index $n_{WG}$ higher than refractive index $n_{OC}$ of the constituent material of the overcoat layer 38, made by using, for example, a sputtering method. For example, in the case that the wavelength $\lambda_L$ of the laser light is 600 nm and the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_XN_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 enables the propagation loss of laser light 53 to be reduced due to the excellent optical characteristics of the constituent material. Further, the waveguide 35 acting as a core can provide the total reflection in all its side surfaces due to the existence of the overcoat layer 38 acting as a clad. As a result, more amount of laser light 53 can reach the position of the buffering portion 50, which improves the propagation efficiency of the waveguide 35.

Furthermore, alternatively, the waveguide 35 may have a multilayered structure of dielectric materials in which the upper a layer is, the higher becomes the refractive index n of the layer. The multilayered structure can be realized, for example, by sequentially stacking dielectric materials of $SiO_XN_Y$ with the composition ratios X and Y appropriately changed. The number of stacked layers may be, for example, in the range from 8 to 12. In the case that laser light 53 has a linear polarization in Z-axis direction, the above-described structure enables the laser light 53 to propagate along the course closer to the buffering portion 50. In this case, by choosing the composition and layer thickness in each layer, and the number of layers of the multilayered structure, the laser light 53 can propagate through the desired positions in Z-axis direction.

The surface plasmon antenna 36 is preferably formed of a conductive material of, for example, metal such as Pd, Pt, Rh, Ir, Ru, Au, Ag, Cu or Al, or an alloy made of at least two of these elements. Further, the surface plasmon antenna 36 can have a width $W_{NF}$ in the track width direction (Y-axis direction) sufficiently smaller than the wavelength of the laser light 53, for example, of approximately 10 to 100 nm. And the surface plasmon antenna 36 can have a thickness $T_{NF1}$ (in Z-axis direction) sufficiently smaller than the wavelength of the laser light 53, thickness $T_{NF1}$ being, for example, in the range of approximately 10 to 100 nm. Further, the thickness $T_{NF}$ (in Z-axis direction) can be set to be sufficiently smaller than the wavelength of the laser light 53 and, for example, in the range of approximately 10 to 100 μm; and the length (height) $H_{NF}$ (in X-axis direction) can be set to be, for example, in the range of approximately 0.8 to 6.0 μm.

The buffering portion 50 is formed of a dielectric material having refractive index $n_{BF}$ lower than the refractive index $n_{WG}$ of the waveguide 35. For example, when the wavelength $\lambda_L$ of the laser light is 600 nm and the waveguide 35 is formed of $Al_2O_3$ (n=1.63), the buffering portion 50 may be formed of $SiO_2$ (n=1.46). Further, when the waveguide 35 is formed of $Ta_2O_5$ (n=2.16), the buffering portion 50 may be formed of $SiO_2$ (n=1.46) or $Al_2O_3$ (n=1.63). In these cases, the buffering portion 50 can be a portion of the overcoat layer 38 (FIG. 2) serving as a clad made of $SiO_2$ (n=1.46) or $Al_2O_3$ (n=1.63).

The length (in X-axis direction) of the buffering portion 50, namely, the length $L_{BF}$ of a coupling portion between the waveguide 35 and the surface plasmon antenna 36 is preferably in the range of 0.5 to 5 μm, and is more preferably larger than the wavelength $\lambda_L$ of the laser light 53. In this preferable case, the coupling portion has an area markedly larger than a so-called "focal region" in the case that, for example, laser light is converged on a buffering portion 50 and a surface plasmon antenna 36 and coupled in a surface plasmon mode. As a result, the coupling portion enables very stable coupling in the surface plasmon mode. Preferably, the thickness $T_{BF}$ (in Z-axis direction) of the buffering portion 50 is in the range of 10 to 200 nm. These length $L_{BF}$ and thickness $T_{BF}$ are important parameters for obtaining proper excitation and propagation of surface plasmon.

The end on the head end surface 388 side of the buffering portion 50 is positioned apart from the head end surface 388 by a distance $D_{BF}$ in X-axis direction. The propagation distance of surface plasmon is adjusted by the distance $D_{BF}$. Alternatively, the buffering portion 50 and the waveguide 35 may extend along the propagation edge 360 and reach the head end surface 388. In this alternative, the coupling portion between the waveguide 35 and the surface plasmon antenna 36 extends over the entire length of the propagation edge 360. Further, as another alternative, it is preferable that a groove is formed in the upper surface (side surface) 354 of the waveguide 35, and a portion of the propagation edge 360 opposed to the waveguide 35 is embedded in the groove or is located directly above the groove. This preferable configuration enables more amount of waveguide light to be coupled with the surface plasmon antenna 36.

Also as shown in FIG. 5, a thermal conduction layer 51 is preferably provided on the head end surface 388 side between the surface plasmon antenna 36 and the first main pole portion 3400a. The thermal conduction layer 51 is formed of, for example, an insulating material such as AlN, SiC or DLC, which has higher thermal conductivity compared with that of the overcoat layer 38 (FIG. 2). The arrangement of such a thermal conduction layer 51 allows a part of the heat generated when the surface plasmon antenna 36 emits near-field light to get away to the main magnetic pole 3400 and the main pole body 3401 through the thermal conduction layer 51. That is, the main magnetic pole 3400 and the main pole body 3401 can be used as a heatsink. As a result, excessive temperature rise of the surface plasmon antenna 36 can be suppressed, and there can be avoided unwanted protrusion of the near-field light generating end surface 36a and substantial reduction in the light use efficiency of the surface plasmon antenna 36.

The thickness $T_{TC}$ of the thermal conduction layer 51 corresponds to a distance $D_{N-P}$ (FIG. 6) on the head end surface 388 between the near-field light generating end surface 36a and the end surface 3400e of the main magnetic pole 3400, and is set to be a sufficiently small value of 100 nm or less. Further, the refractive index $n_{IN2}$ of the thermal conduction layer 51 is set equal to or lower than the refractive index $n_{IN1}$ of the insulating layer 52 that covers the propagation edge 360 of the surface plasmon antenna 36. That is, the propagation edge 360 of the surface plasmon antenna 36 is covered with a material having a refractive index $n_{IN1}$ equal to or higher than the refractive index $n_{IN2}$ of a material covering the end surface 361 opposite to the edge 360. This allows surface plasmon to propagate stably on the propagation edge 360. It is known to be preferable in practice to satisfy the relation of (refractive index $n_{IN1}$)≧(refractive index $n_{IN2}$)×1.5.

Also according to FIG. 5, the main magnetic pole layer 340 includes, as described-above, the main magnetic pole 3400 and the main pole body 3401. The main magnetic pole 3400 includes; the first main pole portion 3400a having the end surface 3400e reaching the head end surface 388; and the second main pole portion 3400b, the end portion on the head end surface 388 side of which is overlapped on a portion of the first main pole portion 3400a, the portion being on the side opposite to the head end surface 388. Further, the end portion on the head end surface 388 side of the main pole body 3401 is overlapped on a portion of the second main pole portion 3400b, the portion being on the side opposite to the head end surface 388. Namely, the end portion on the head end surface 388 side of the main magnetic pole layer 340 extends slantwise relative to the element-integration surface 2102 (FIG. 3), and become closer to the end portion on the head end surface 388 side of the surface plasmon antenna 36 toward the surface 388. As a result, the end surface 3400e of the main magnetic pole layer 340 can be made sufficiently close to the near-field light generating end surface 36a, under the condition that the main magnetic pole layer 340 is sufficiently separated apart from the waveguide 35.

Figure 6:
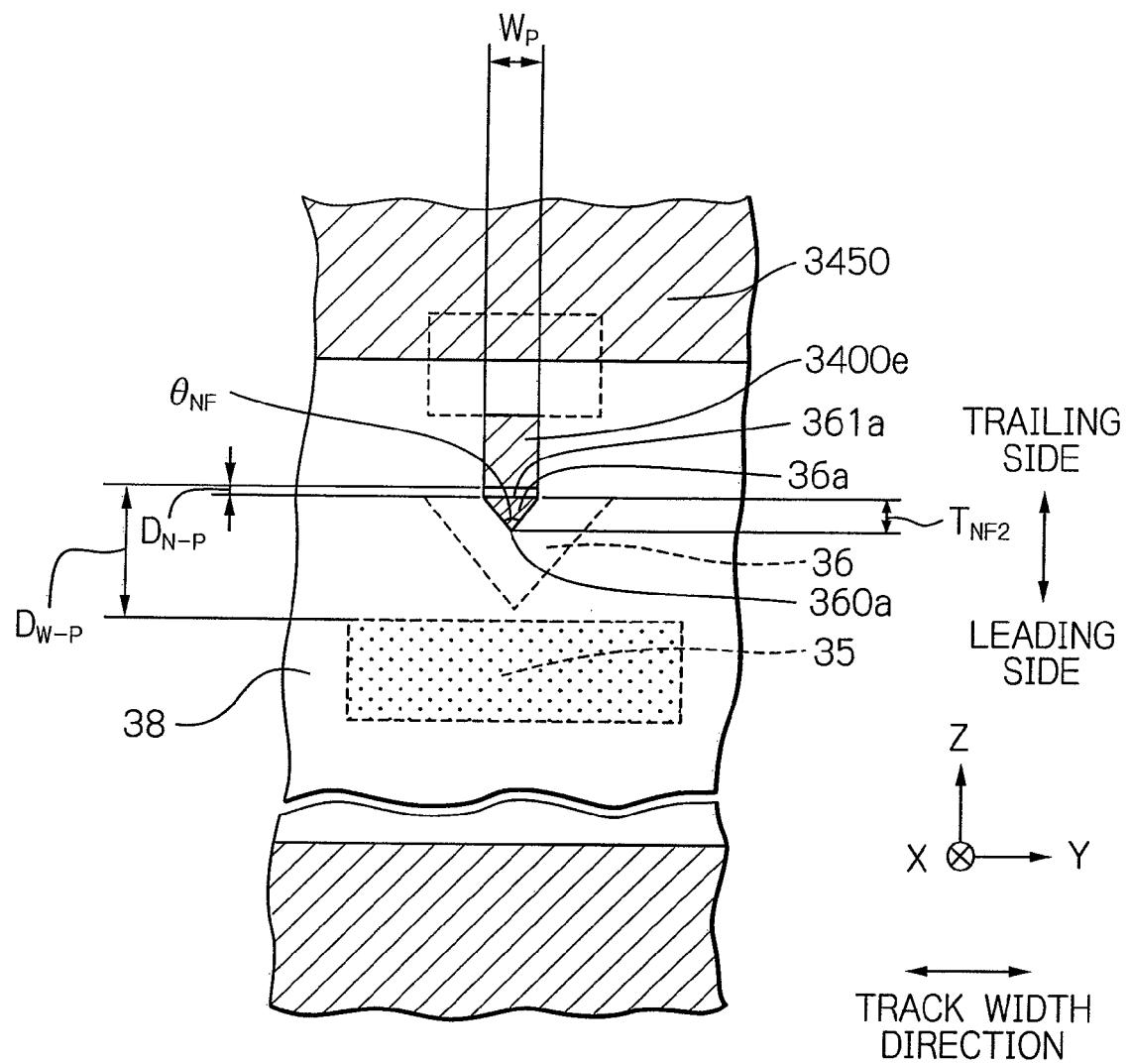
FIG. 6 shows a plan view illustrating the shapes of the end surfaces of the surface plasmon antenna and the electromagnetic transducer on the head end surface.

FIG. 6 shows a plan view illustrating the shapes of the end surfaces of the surface plasmon antenna 36 and the electromagnetic transducer 34 on the head end surface 388.

As shown in FIG. 6, the main magnetic pole 3400 (the first main pole portion 3400a) and the write shield layer 345 (the trailing shield 3450) of the electromagnetic transducer 34 reach the head end surface 388. The shape of the end surface 3400 e of the main magnetic pole 3400 on the head end surface 388 is, for example, a rectangle, a square or a trapezoid. Here, the above-described width $W_P$ is a length of the edge along the track width direction (Y-axis direction) of the end surface 3400e of the main magnetic pole 3400, and provides the width of a track formed on the magnetic recording layer of the magnetic disk. The width $W_P$ is, for example, in the range of approximately 0.05 to 0.5 µm.

Moreover, on the head end surface 388, the near-field light generating end surface 36a of the surface plasmon antenna 36 is positioned close to the end surface 3400e of the main magnetic pole 3400 and in the leading side (−Z side) of the end surface 3400e. Here, a distance $D_{N-P}$ between the near-field light generating end surface 36a and the end surface 3400e is set to be a sufficiently small value of, for example, 100 nm or less, preferably 20 nm or more, and more preferably 30 nm or more. In the thermally-assisted magnetic recording according to the present invention, the near-field light generating end surface 36a functions as a main heating action part, and the end surface 3400e functions as a writing action part. Therefore, write field with sufficiently large gradient can be applied to a portion of the magnetic recording layer of the magnetic disk, which has been sufficiently heated. This enables a stable thermally-assisted write operation to be securely achieved.

Furthermore, in the present embodiment, the near-field light generating end surface 36a has a shape of isosceles triangle on the head end surface 388, which has a bottom edge 361a on the trailing side (+Z side) and an apex on the leading side (−Z side) that is an end 360a of the propagation edge 360. The height $T_{NF2}$ of the near-field light generating end surface 36a (the thickness of the surface plasmon antenna 36 on the head end surface 388) is preferably 100 nm or less, and more preferably 30 nm or less. Thereby, the near-field-light emitting position on the end surface 36a becomes close to the edge 361a on the trailing side, that is, closer to the end surface 3400e of the main magnetic pole 3400. Further, the apex angle $\theta_{NF}$ of the apex 360a of the isosceles triangle is preferably 60 to 130 degrees, and more preferably 80 to 110 degrees. This adjustment of the apex angle $\theta_{NF}$ enables the near-field-light emitting position on the end surface 36a to be further on the trailing side. Here, the above-described values of $T_{NF2}$ and $\theta_{NF}$ are true in the case that the surface plasmon antenna 36 extends in the direction perpendicular to the head end surface 388 (edge 2102a).

Further, a distance $D_{W-P}$ between the waveguide 35 and the main magnetic pole 3400 is made sufficiently large while the distance $D_{N-P}$ is set to a minute value as described above. That is, by applying the configuration according to the present invention shown in FIG. 5, the waveguide 35 can be sufficiently separated apart from the main magnetic pole 3400 and the main pole body 3401. As a result, there can be avoided such a situation in which a part of the laser light is absorbed into the main magnetic pole 3400 and the main pole body 3401 made of metal, and the amount of light to be converted into near-field light is reduced.

Figure 7:
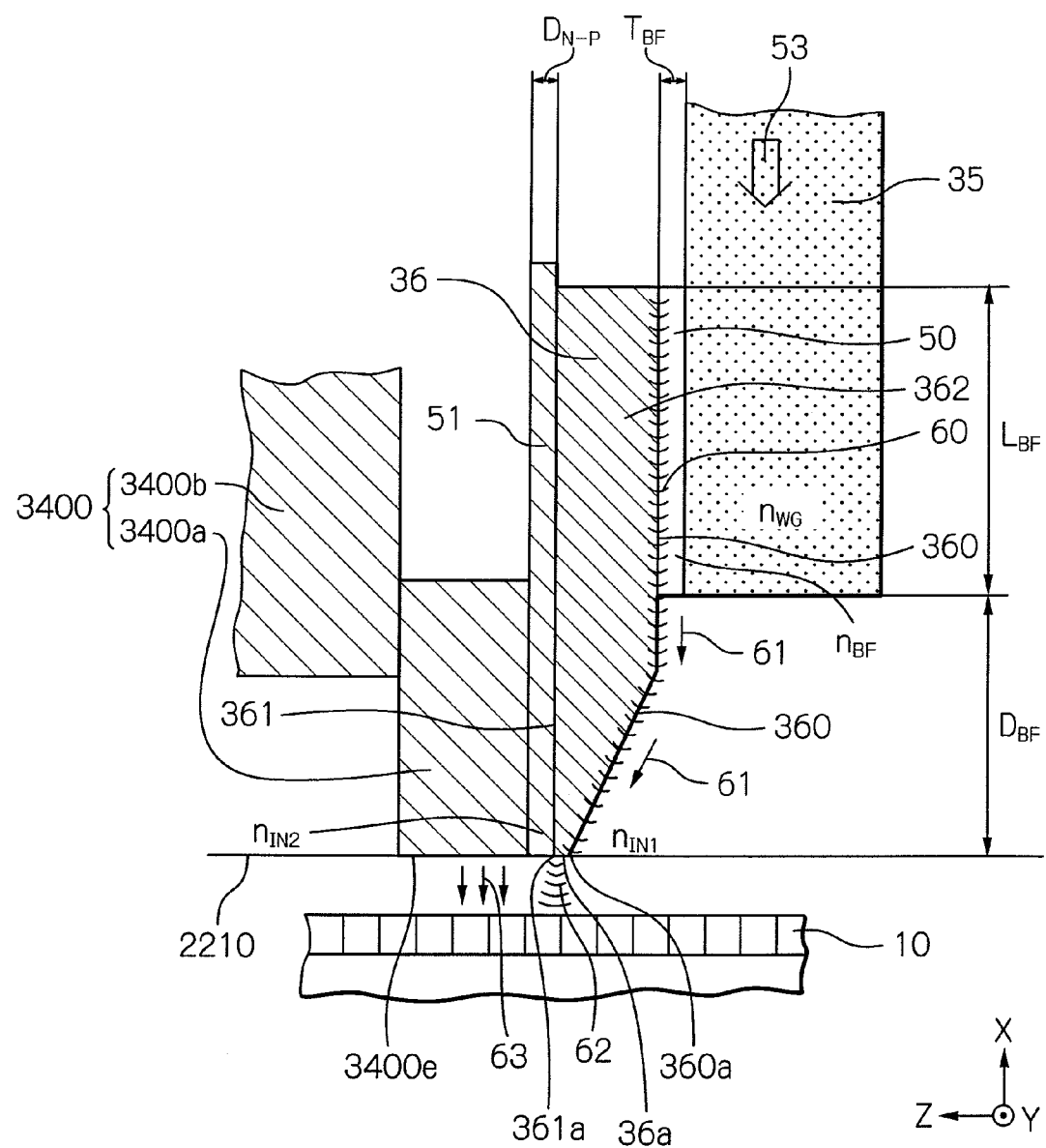
FIG. 7 shows a schematic diagram for explaining the thermally-assisted magnetic recording utilizing the surface plasmon mode according to the present invention.

FIG. 7 shows a schematic diagram for explaining the thermally-assisted magnetic recording utilizing the surface plasmon mode according to the present invention.

Referring to FIG. 7, when the electromagnetic transducer 34 writes data onto the magnetic recording layer of the magnetic disk 10, first, laser light emitted from the laser diode 40 propagates through the waveguide 35. Next, the waveguide light 53, which has advanced to near the buffering portion 50, couples with the optical configuration including the waveguide 35 with a refractive index $n_{WG}$, the buffering portion 50 with a refractive index $n_{BF}$ and the surface plasmon antenna 36 made of a conductive material such as metal, and induces a surface plasmon mode on the propagation edge 360 of the surface plasmon antenna 36. That is, the waveguide light couples with the surface plasmon antenna 36 in the surface plasmon mode. Actually, evanescent light is excited within the buffering portion 50 under an optical boundary condition between the waveguide 35 as a core and the buffering portion 50. Then, the evanescent light couples with the fluctuation of electric charge excited on the metal surface (propagation edge 360) of the surface plasmon antenna 36, and induces the surface plasmon mode. To be exact, there excited is surface plasmon polariton in this system because surface plasmon as elementary excitation is coupled with an electromagnetic wave. However, the surface plasmon polariton will be hereinafter referred to as surface plasmon for short.

The propagation edge 360 is located closest to the waveguide 35 on the inclined lower surface 362 of the surface plasmon antenna 36, and is just an edge where electric field tends to converge; thus surface plasmon can easily be excited on the edge 360. In this case, the surface plasmon mode can be induced by setting the refractive index $n_{BF}$ of the buffering portion 50 lower than the refractive index $n_{WG}$ of the waveguide 35 ($n_{BF} < n_{WG}$), and further by properly selecting the length (in X-axis direction) of the buffering portion 50, namely, the length $L_{BF}$ of the coupling portion between the waveguide 35 and the surface plasmon antenna 36, and the thickness $T_{BF}$ (in Z-axis direction) of the buffering portion 50. In the induced surface plasmon mode, the surface plasmon 60 is excited on the propagation edge 360 of the surface plasmon antenna 36, and propagates on the propagation edge 360 along the direction shown by arrows 61. The propagation of the surface plasmon 60 can occur under the condition that the propagation edge 360 of the surface plasmon antenna 36 is covered with a material having refractive index $n_{IN1}$ equal to or higher than the refractive index $n_{IN2}$ of a material covering the end surface 361 on the side opposite to the edge 360. It is known to be preferable in practice to satisfy the relation of (refractive index $n_{IN1}$)=(refractive index $n_{IN2}$)×1.5. In FIG. 7, the refractive index $n_{IN2}$ of the thermal conduction layer 51 is set so as to be lower than the refractive index $n_{IN1}$ of the insulating layer 52 covering the propagation edge 360 of the surface plasmon antenna 36.

By the above-described propagation of the surface plasmon 60, the surface plasmon 60, namely, electric field converges in the near-field light generating end surface 36a that reaches the head end surface 388 and includes the apex 36a that is the destination of the propagation edge 360. As a result, near-field light 62 is emitted from the near-field light generating end surface 36a. The near-field light 62 is radiated toward the magnetic recording layer of the magnetic disk 10, and reaches the surface of the magnetic disk 10 to heat a portion of the magnetic recording layer of the magnetic disk 10. This heating reduces the anisotropic magnetic field (coercive force) of the portion to a value with which write operation can be performed. Immediately after the heating, write field 63 generated from the main magnetic pole 3400 is applied to the portion to perform write operation. Thus, the thermally-assisted magnetic recording can be achieved.

As described above, by adjusting the shape and size of the near-field light generating end surface 36a on the head end surface 388, the emitting position of near-field light 62 on the end surface 36a can be set to be closer to the first main pole portion 3400a on the trailing side (on the edge 361a side). As a result, write field with sufficiently large gradient can be applied to a portion of the magnetic recording layer of the magnetic disk 10, which has been sufficiently heated. This enables a stable thermally-assisted write operation to be securely achieved.

Further, the propagation edge 360, for propagating surface plasmon 60, of the surface plasmon antenna 36 according to the present invention is a propagation region with a very narrow width in the track width direction. In the present embodiment, the cross-section taken by YZ plane of the surface plasmon antenna 36 has a triangular shape, especially a predetermined triangular shape in the vicinity of the head end surface 388. Therefore, the near-field light generating end surface 36a, which appears as a polished surface on the head end surface 388 formed through polishing process in the head manufacturing, can be made a desired shape (a triangle in the present embodiment) with a very small size, and further can be set in such a way that surface plasmon propagates to reach the end surface 36a reliably.

Furthermore, in a conventional case in which a plasmon antenna provided on the end surface of a head is directly irradiated with the waveguide light, most of the irradiated laser light has been converted into thermal energy within the plasmon antenna. In this case, the size of the plasmon antenna has been set equal to or smaller than the wavelength of the laser light, and its volume is very small. Therefore, the plasmon antenna has been brought to a very high temperature, for example, 500° C. (degrees Celsius) due to the thermal energy. On the contrary, in the thermally-assisted magnetic recording according to the present invention, the surface plasmon mode is used, and the near-field light 62 is generated by propagating the surface plasmon 60 toward the head end surface 388. This brings the temperature at the near-field light generating end surface 36a to, for example, about 100° C. during the emission of near-field light, which is greatly reduced compared to the conventional. This reduction of temperature allows the protrusion of the near-field light generating end surface 36a toward the magnetic disk 10 to be suppressed; thereby favorable thermally-assisted magnetic recording can be achieved.

Furthermore, the length $L_{BF}$ of the whole buffering portion 50, that is, the portion through which the waveguide 35 and the surface plasmon antenna 36 are coupled with each other in a surface plasmon mode, is preferably larger than the wavelength $\lambda_L$ of the laser light. In this preferable case, the coupling portion has an area markedly larger than a so-called "focal region" in the case that, for example, laser light is converged on a buffering portion and a surface plasmon antenna and coupled in a surface plasmon mode. Therefore, the configuration quite different from the system including such "focal region" can be realized in the present invention; thus, very stable coupling in the surface plasmon mode can be achieved. The induction of surface plasmon mode is disclosed in, for example, Michael Hochberg, Tom Baehr-Jones, Chris Walker & Axel Scherer, "Integrated Plasmon and dielectric waveguides", OPTICS EXPRESS Vol. 12, No. 22, pp 5481-5486 (2004), US patent Publication No. 2005/0249451 A1, and U.S. Pat. No. 7,330,404 B2.

FIGS. 8a1 to 8g show schematic diagrams illustrating various embodiments of the thermally-assisted magnetic recording head according to the present invention.

In embodiments shown in FIGS. 8a1 and 8a2, the arrangement of the waveguide 35, the surface plasmon antenna 36, the main magnetic pole layer 340 and the laser diode 40 is the same as that shown in FIGS. 3, 4 and 5. However, a write shield layer 70, which is a return yoke for receiving the magnetic flux returned from a magnetic disk, is provided in the side opposite to the main magnetic pole layer 340 in relation to the waveguide 35 and the surface plasmon antenna 36, that is, in the leading side (−Z side) of the waveguide 35 and the surface plasmon antenna 36. And the write shield layer 70 is magnetically connected to the main magnetic pole layer 340 with a back contact portion 71. Further, a write coil layer 343' is formed so as to pass through at least between the main magnetic pole layer 340 and the write shield layer 70 during one turn, and has a spiral structure in which the coil layer is wound around the back contact portion 71 as the center.

Accordingly, the portion on the head end surface 388 side of the waveguide 35 and the surface plasmon antenna 36 are positioned between the write shield layer 70 and the main magnetic pole layer 340 as shown in FIG. 8a1. In spite of this arrangement, since the waveguide 35 extends in a curve from the laser diode 40 as shown in FIG. 8a2, the waveguide 35 can reach the vicinity of the surface plasmon antenna 36, keeping away from the back contact portion 71. With this curved structure, it becomes unnecessary to employ a special structure for the waveguide 35 to pass through the back contact portion 71. This makes it possible to avoid the increase of man-hour and the reduction of process yield. This curved structure also makes it possible to avoid absorption of the waveguide light by the back contact portion 71, thereby to lower and suppress the propagation loss in the waveguide 35. As a result, desirable thermally-assisted magnetic recording using a surface plasmon antenna can be performed.

Figure 8B:
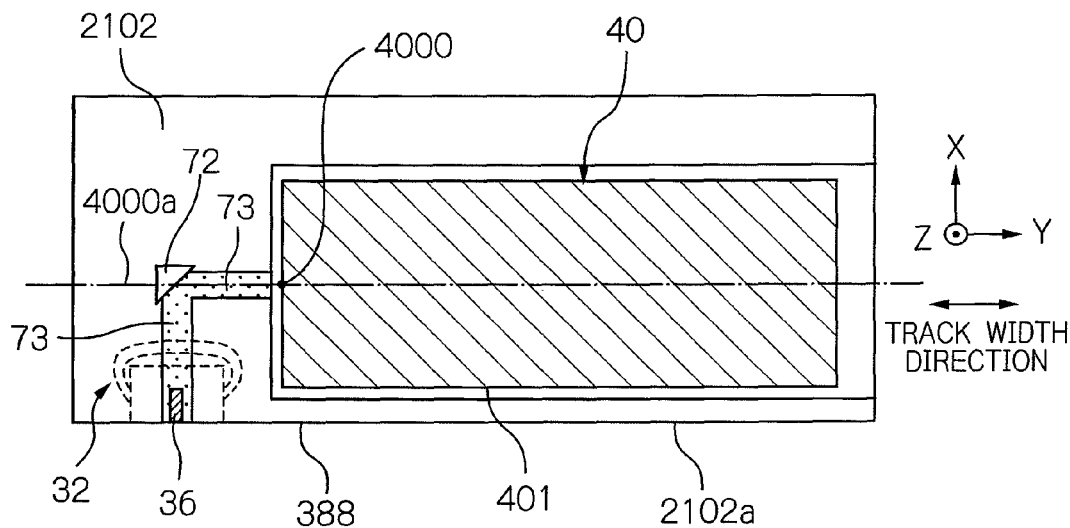

According to the embodiment shown in FIG. 8b, similarly to the embodiment of FIG. 2, the laser diode 40 is disposed in the element-integration surface 2102 in such a way that the edge 401 in the direction along the optical axis 4000a is parallel with the edge 2102a of the element-integration surface 2102. There is provided a waveguide 73 having a portion extending in Y-axis direction and a portion extending in X-axis direction, and further, a mirror 72 acting as a light-path changing means is provided between these portions of the waveguide 73. The mirror 72 changes the traveling direction of the waveguide light, which has propagated from the light-emission center 4000 of the laser diode 40 through the portion extending in Y-axis direction of the waveguide 73, to a direction toward the head end surface 388; then the waveguide light is directed toward the surface plasmon antenna 36 through the portion extending in X-axis direction of the waveguide 73. The mirror 72 can be a triangle pole extending in Z-axis direction and having a surface for reflecting laser light, which is formed of a metal such as Au, Cu, NiFe or the like. By using the optical system described above, even when the laser diode 40 is disposed in the element-integration surface 2102 and the optical axis 4000a is directed toward the track width direction (Y-axis direction), the waveguide light can be propagated up to the vicinity of the head end surface 388 and coupled to the surface plasmon antenna 36.

Figure 8C:
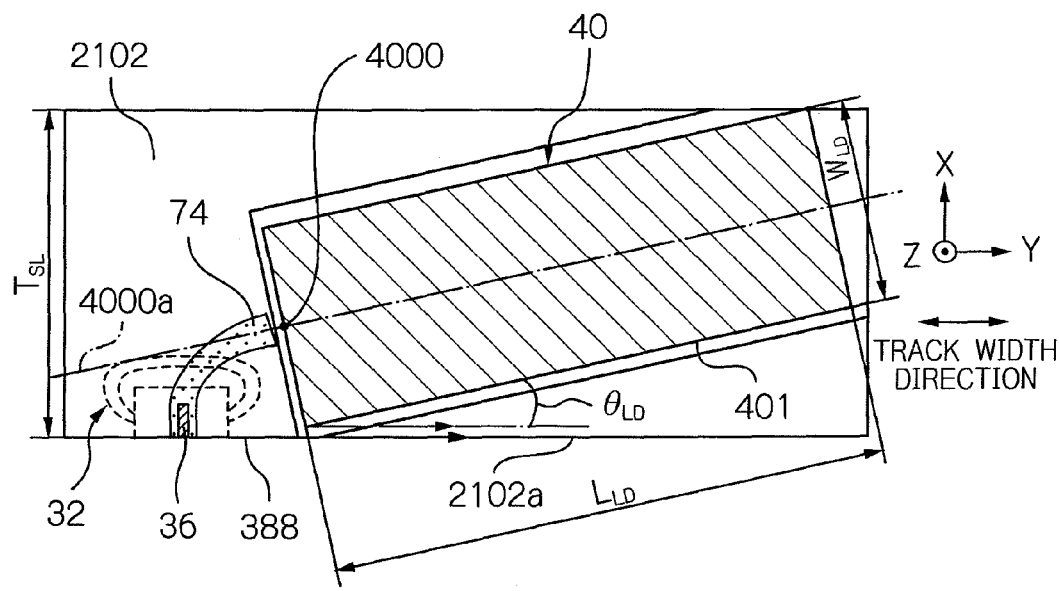

According to the embodiment shown in FIG. 8c, the laser diode 40 is disposed in such a way that the edge 401 in the direction along the optical axis 4000a is inclined within the element-integration surface 2102 at a predetermined acute angle $\theta_{LD}$ from the edge 2102a of the element-integration surface 2102. This inclined configuration allows the overall curvature of a waveguide 74 to be made smaller by the acute angle $\theta_{LD}$, the waveguide 74 optically connecting between the light-emission center 4000 of the laser diode 40 and the surface plasmon antenna 36. As a result, a ratio of the waveguide light leaking from the waveguide 74 is reduced, and the propagation loss can be more suppressed. Here, considering a case that the laser diode 40 is set without protruding from the element-integration surface 2102a for maintaining cooling efficiency of the laser diode 40 during operation, the maximum acute angle MAX$\theta_{LD}$ to be set for the acute angle $\theta_{LD}$ is given by:

$$\text{MAX}\theta_{LD} = \sin^{-1}(T_{SL}*(L_{LD}^2 + W_{LD}^2)^{-0.5}) - \tan^{-1}(W_{LD}/L_{LD}). \quad (1)$$

Figure 8D:
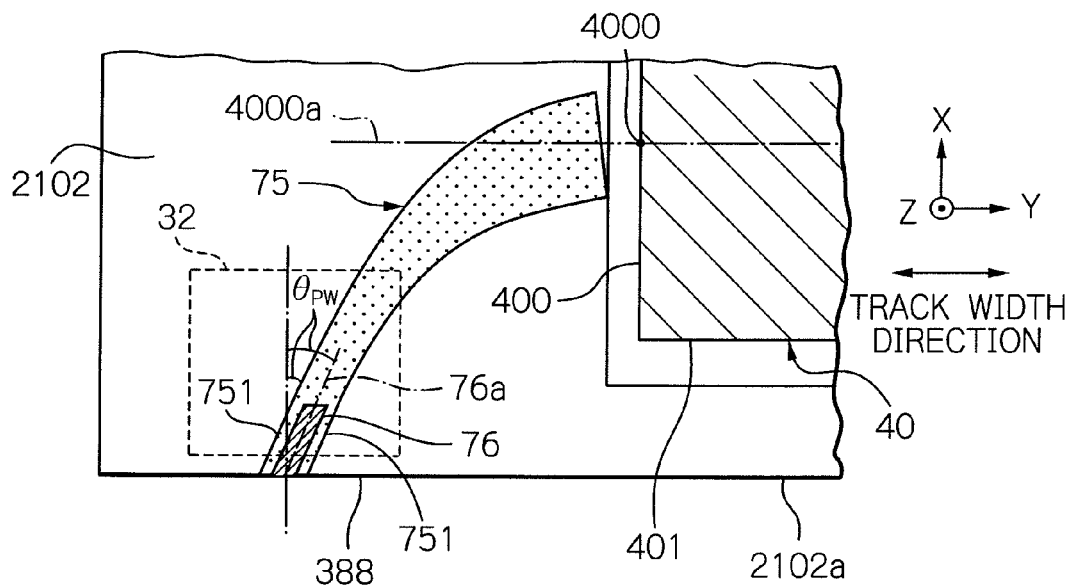

According to the embodiment shown in FIG. 8d, similarly to the embodiment of FIG. 2, the laser diode 40 is disposed in the element-integration surface 2102 in such a way that the edge 401 in the direction along the optical axis 4000a is parallel with the edge 2102a of the element-integration surface 2102. The waveguide 75 extends to the vicinity of the surface plasmon antenna 76 so that the laser light emitted from the light-emission center 4000 of the laser diode 40 can be coupled with the surface plasmon antenna 76. Here, a longitudinal axis 76a of the surface plasmon antenna 76 and side surfaces 751 of a portion of the waveguide 75 near the head end surface 388 are inclined within the element-integration surface 2102 at an inclination angle $\theta_{PW}$ from a direction perpendicular to the edge 2102a (to the head end surface 388) toward the end surface 400 including the light-emission center 4000. By arranging the surface plasmon antenna 76 and the portion near the head end surface 388 of the waveguide 75 with an inclination as in the present embodiment, the overall curvature of the waveguide 75 can be made smaller by the inclination angle $\theta_{PW}$. As a result, a ratio of the waveguide light leaking from the waveguide 75 is reduced, and the propagation loss can be more suppressed. Here, the surface plasmon antenna 76 is also inclined along the waveguide light propagating through the portion near the head end surface 388 of the waveguide 75; therefore, the degree of coupling between the waveguide light and the surface plasmon antenna 76 is not reduced even by setting the inclination angle $\theta_{PW}$.

The inclination angle $\theta_{PW}$ is preferably 00 (degree) or more, and 30° or less, as will be explained with use of practical examples later. By setting the inclination angle $\theta_{PW}$ to 30° or less, a spot diameter of the light (near-field light) in the near-field light generating end surface of the surface plasmon antenna 76 can become sufficiently small. Thereby, the near-field light can effectively heat a desired portion on the magnetic recording layer of a magnetic disk.

Figure 8E:
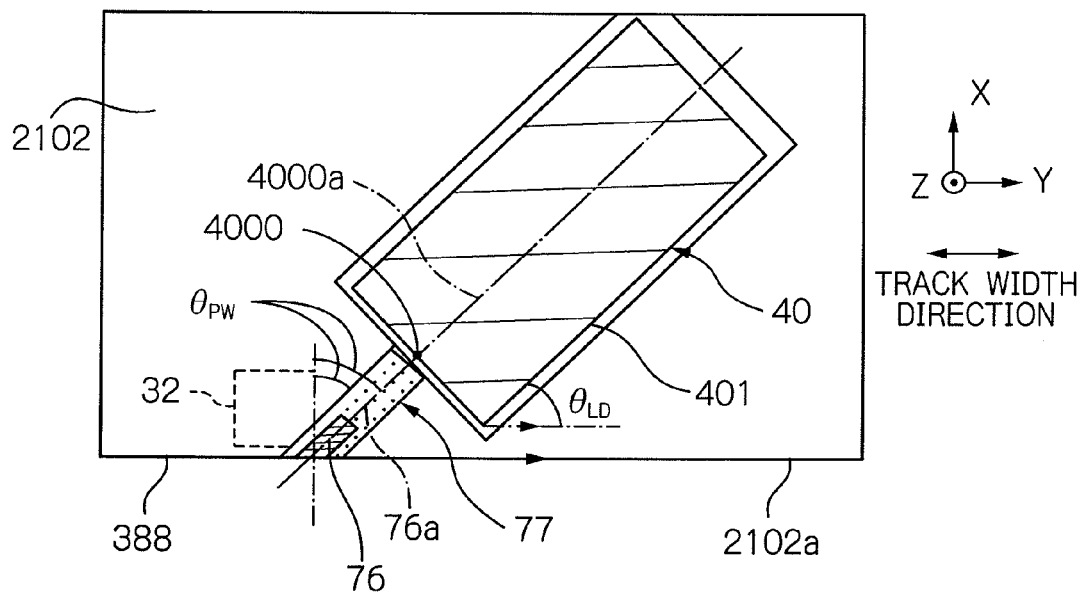

According to the embodiment of FIG. 8e, similarly to FIG. 8c, the laser diode 40 is disposed in such a way that the edge 401 in the direction along the optical axis 4000a is inclined within the element-integration surface 2102 at a predetermined acute angle $\theta_{LD}$ from the edge 2102a of the element-integration surface 2102. While the surface plasmon antenna 76 is, similarly to FIG. 8d, provided in such a way that its longitudinal axis 76a is inclined within the element-integration surface 2102 at an inclination angle $\theta_{PW}$ from a direction perpendicular to the edge 2102a toward the end surface 400 including the light-emission center 4000. Here, by setting the sum of the acute angle $\theta_{LD}$ and the inclination angle $\theta_{PW}$ to be approximately 90°, the overall curvature of the waveguide 77 becomes zero, the waveguide 77 optically connecting between the light-emission center 4000 of the laser diode 40 and the surface plasmon antenna 76, thus the waveguide 77 can be a linear path. As a result, a phenomenon of leakage of the waveguide light due to the curvature of the waveguide path can be prevented, and the propagation loss can be more suppressed.

Figure 8F:
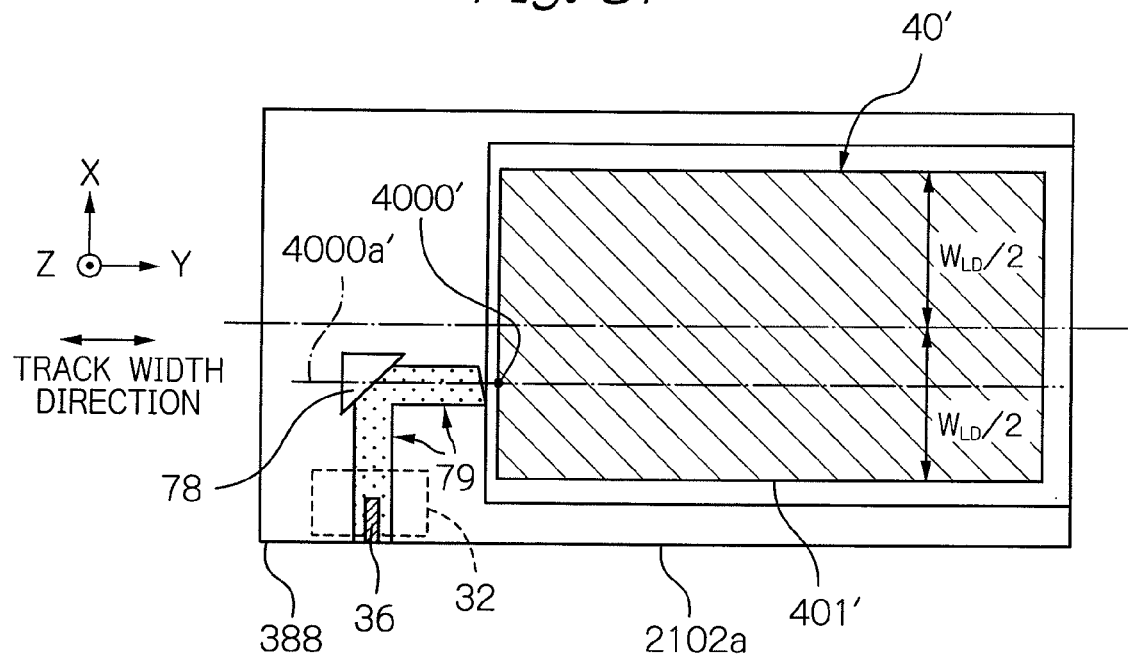

According to FIG. 8f, a light-emission center 4000' and an optical axis 4000a' of a laser diode 40' are shifted to the edge 401' side from a centerline indicating a center of the laser diode 40' in the width $W_{LD}$ direction (X-axis direction). In the present embodiment, the laser diode 40' is disposed in such a way that the edge 401' is parallel with the edge 2102a of the element-integration surface 2102. Further, a mirror 78 and a waveguide 79 are provided in a similar arrangement to that of FIG. 8b. The mirror 78 changes the traveling direction of the waveguide light, which has propagated from the light-emission center 4000' of the laser diode 40' through the portion extending in Y-axis direction of the waveguide 79, to a direction toward the head end surface 388; thus, the waveguide light is directed toward the surface plasmon antenna 36 through the portion extending in X-axis direction of the waveguide 79. In this case, the light-emission center 4000' and the optical axis 4000a' are positioned closer to the head end surface 388 compared to the light-emission center 4000 and the optical axis 4000a shown in FIG. 8b. Accordingly, the length of the portion extending in X-axis direction of the waveguide 79 can be set smaller than that of the portion extending in X-axis direction of the waveguide 73 shown in FIG. 8b. As a result, the waveguide length of the whole waveguide 79 can be made shorter, and the propagation loss in the whole waveguide 79 can be more reduced.

Figure 8G:
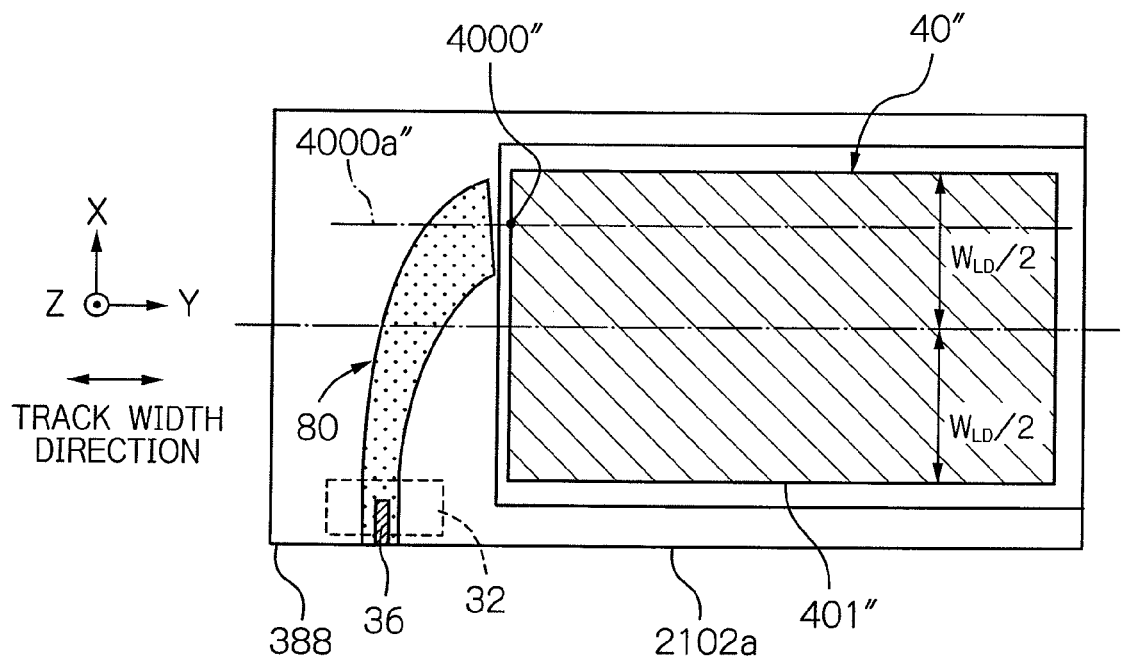

According to FIG. 8g, a light-emission center 4000" and an optical axis 4000a" of a laser diode 40" are shifted to the side opposite to an edge 401" from a centerline indicating a center of the laser diode 40" in the width $W_{LD}$ direction (X-axis direction). In the present embodiment, the laser diode 40" is disposed in such a way that the edge 401" is parallel with the edge 2102a of the element-integration surface 2102. Moreover, a waveguide 80, similarly to the waveguide 35 shown in FIG. 4, extends in a curve from the light-emission center 4000" to the vicinity of the surface plasmon antenna 36. In this case, the light-emission center 4000" and the optical axis 4000a" are positioned farther from the head end surface 388 compared to the light-emission center 4000 and the optical axis 4000a shown in FIG. 4. Accordingly, the curvature of the whole waveguide 80 can be made smaller. As a result, a ratio of the waveguide light leaking from the waveguide 80 due to the curvature can be more reduced.

The shifting of the light-emission center and the optical axis from a centerline indicating the center in the width direction as in the laser diodes 40' and 40" shown in FIGS. 8f and 8g can be implemented, for example, by shifting the positions of two grooves in a ridge structure formed on the p-electrode side of a laser diode. In this case, the light-emission center is positioned between the two grooves.

FIG. 9 shows a cross-sectional view illustrating another embodiment in the HGA according to the present invention.

According to the embodiment of FIG. 9, a thermally-assisted magnetic recording head 21' is provided with a laser diode 81, the waveguide 35 and the surface plasmon antenna 36 on the element-integration surface 2102'. The laser diode 81 includes a second light-emission center 8100' on the side opposite to the light-emission center 8100 from which laser light is emitted toward the waveguide 35. By detecting the laser light emitted from the second light-emission center 8100' by a photo-detector, feedback adjustment for output of the laser diode 81 can be performed. With this adjustment, there can be suppressed the output change of the laser diode 81 depending on its environment and the output change over time of the laser diode 81; thus the intensity of near-field light emitted from the surface plasmon antenna 36 can be stabilized. As a result, proper heating of the magnetic recording layer of a magnetic disk can be secured.

Referring also to FIG. 9, a mirror 83 as a light-path changing means and a detection-waveguide 84 used for light detection are provided, in the element-integration surface 2102', on the side opposite to the head element 32 in relation to the laser diode 81. Further, there is provided a through-hole 2010' in a flexure 201' that supports the thermally-assisted magnetic recording head 21', and a photodiode 82, as a photo-detector for sensing the laser light emitted from the laser diode 81, is fixed on the surface of the flexure 201' on the opposite side to the head 21'. A light-receiving window 820 of the photodiode 82 is positioned so as to receive the laser light from the detection-waveguide 84 through the through-hole 2010'. The alignment accuracy of the positioning is not required to be so high as in the optical system including the waveguide 35 and the surface plasmon antenna 36. Therefore, the laser-light output can be securely measured and monitored even when the HGA is in use. Terminal electrodes 821 of the photodiode 82 may be electrically connected to the connection pads of the wiring member provided on the flexure 201'.

The detection-waveguide 84 for light detection has a portion extending in Y-axis direction and a portion extending in X-axis direction. While, the mirror 83 for light detection is arranged between these portions of the waveguide 84. The mirror 83 changes the traveling direction of the waveguide light, which has propagated from the second light-emission center 8100' of the laser diode 81 through the portion extending in Y-axis direction of the waveguide 84, to a direction toward the head end surface 387 on the side opposite to the head end surface 388. The waveguide light is launched into the light-receiving window 820 of the photodiode 82, through the portion extending in X-axis direction of the waveguide 84 and the through-hole 2010' of the flexure 201'. This configuration enables the output of the laser diode 81 to be always measured and monitored, thereby performing the feedback adjustment. In the present embodiment, it is not necessary that the photodiode 82 for feedback adjustment is provided within the thermally-assisted magnetic recording head 21'. As a result, manufacturing of the head 21' becomes relatively easier, and the manufacturing yield is improved.

Configuration of performing feedback adjustment for the output of the laser diode 81 is not limited to the present embodiment. For example, a photodiode may be placed in the vicinity of the side surface 351 of the waveguide 35 in the embodiment shown in FIG. 4 to measure and monitor the light leaking from the waveguide 35.

Figure 10:
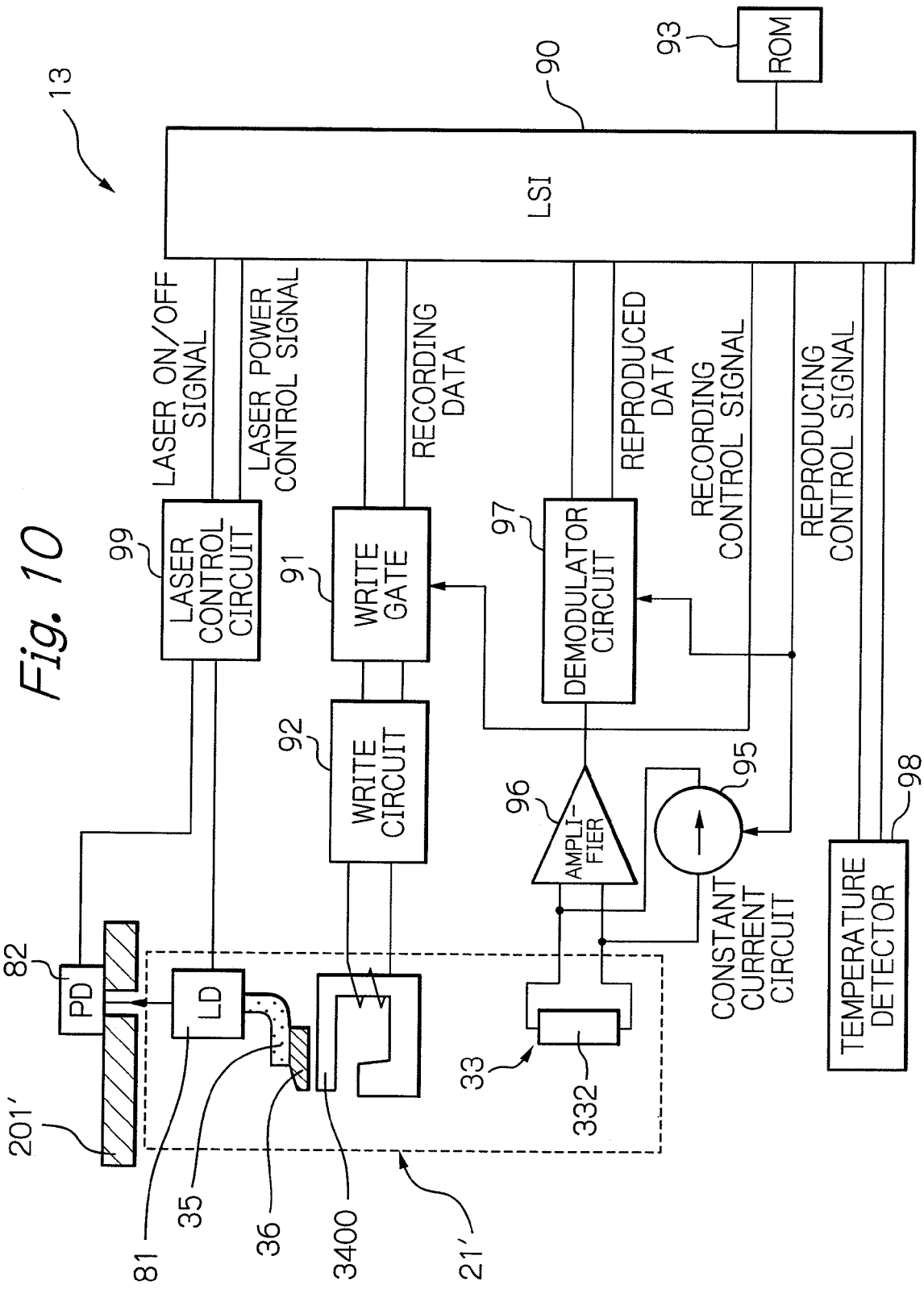
FIG. 10 shows a block diagram illustrating the circuit structure of the recording/reproducing and light-emission control circuit of the magnetic disk apparatus shown in FIG. 1.

FIG. 10 shows a block diagram illustrating the circuit structure of the recording/reproducing and light-emission control circuit 13 of the magnetic disk apparatus shown in FIG. 1. In the embodiment shown in this figure, the target to be controlled is the HGA shown in FIG. 9, in which the feedback adjustment can be performed for the output of the laser diode 81.

According to FIG. 10, reference numeral 90 indicates a control LSI, 91 indicates a write gate for receiving recording data from the control LSI 90, 92 indicates a write circuit, 93 indicates a ROM that stores a control table or the like for controlling the value of drive current supplied to the laser diode, 95 indicates a constant current circuit for supplying sense current to the MR element 33, 96 indicates an amplifier for amplifying the output voltage from the MR element 33, 97 indicates a demodulator circuit for outputting reproduced data to the control LSI 90, 98 indicates a temperature detector, and 99 indicates a control circuit for controlling the laser diode 81, respectively.

The recording data outputted from the control LSI 90 is supplied to the write gate 91. The write gate 91 supplies recording data to the write circuit 92 only when a recording control signal outputted from the control LSI 90 instructs a write operation. The write circuit 92 applies write current according to this recording data to the write coil layer 343, and then a write operation is performed onto the magnetic disk with write field generated from the main magnetic pole 3400.

A constant current flows from the constant current circuit 95 into the MR multilayer 332 only when the reproducing control signal outputted from the control LSI 90 instructs a read operation. The signal reproduced by the MR element 33 is amplified by the amplifier 96, demodulated by the demodulator circuit 97, and then, the obtained reproduced data is outputted to the control LSI 90.

The laser control circuit 99 receives a laser ON/OFF signal and a laser power control signal, which are outputted from the control LSI 90. When the laser ON/OFF signal indicates an ON operation instruction, a drive current of an oscillation threshold value or more is applied into the laser diode 81. Thereby, the laser diode 81 emits light; then the laser light propagates through the waveguide 35 and couples with the surface plasmon antenna 36 in a surface plasmon mode. As a result, near-field light is generated from the end of the surface plasmon antenna 36, and then the magnetic recording layer of the magnetic disk is irradiated with the near-field light, which heats the magnetic recording layer. The value of the drive current in this occasion is controlled to such a value that the laser diode 81 emits a laser light whose output is specified by the laser power control signal. The control LSI 90 generates the laser ON/OFF signal with its timing adjusted according to recording/reproducing operations, and determines the value of the laser power control signal by referring the value of temperature in the magnetic recording layer of the magnetic disk or the like, which is measured by the temperature detector 98, based on the control table in the ROM 93. Here, the control table may include data about the relation between the drive current value and the mount of temperature increase by thermal-assist operation in the magnetic recording layer, and data about the temperature independence of the anisotropic magnetic field (coercive force) of the magnetic recording layer, as well as the temperature dependences of the oscillation threshold value and the characteristics of light output vs. drive current. Thus, it is possible to realize not only a current application to the laser diode 81 linked simply with the recording operation but also more diversified current application modes, by providing the system of the laser ON/OFF signal and the laser power control signal independently from the recording/reproducing control signal system.

The photodiode 82 fixed on the flexure 201' measures and monitors the output of the laser diode 81, and sends the measured values to the laser control circuit 99. The laser control circuit 99 performs the feedback adjustment with use of the measured values, and adjusts the drive current applied to the laser diode 81 in such a way that the laser diode 81 emits a laser light whose output is specified by the laser power control signal.

Obviously, the circuit structure of the recording/reproducing and light-emission control circuit 13 is not limited to that shown in FIG. 10. It is also possible to specify write and read operations by using a signal other than the recording control signal and reproducing control signal.

FIGS. 11a1 to 11c show schematic diagrams explaining one embodiment of a method for mounting the laser diode 40 in the element-integration surface 2102 of the slider substrate 210, in the method for manufacturing the thermally-assisted magnetic recording head according to the present invention. Here, FIGS. 11a2 and 11b2 are cross-sectional views taken along lines B-B and C—C of FIGS. 11a1 and 11b1, respectively.

As shown in FIGS. 11a1 and 11a2, first, formed on the element-integration surface 2102 of the slider substrate 210 is a base layer 380, made of an insulating material such as $Al_2O_3$ (alumina), $SiO_2$ or the like. Next, formed on the base layer 380 is a lead electrode 4100 made of a conductive material such as Au or the like. Further, there is formed a mask 85 for forming a concave portion 389 that includes a position where the laser diode 40 is to be placed later, so as to cover the formed lead electrode 4100. The mask 85 can be formed of a metal such as, for example, NiFe (Permalloy), which can be etched selectively so as to leave the material such as Au forming the lead electrode 4100. Here, each of the base layer 380, the lead electrode 4100 and the mask 85 can be formed by using, for example, a sputtering method.

Next, as shown in FIGS. 11b1 and 11b2, the MR element 33, the waveguide 35, the surface plasmon antenna 36 and the electromagnetic transducer 34 are sequentially formed in a predetermined position of the base layer 380. In these formations, these elements are set in such a way that a distance $D_{W-S}$ between a centerline indicating the center of the waveguide 35 in the stacking direction (Z-axis direction) and the upper surface of the base layer 380 is equal to a distance between the light-emission center 4000 of the laser diode 40, which is to be disposed later, and the upper surface of the base layer 380. Then, an overcoat layer 38 is formed within the element-integration surface 2102 so as to cover these elements. Thereafter, terminal electrodes including terminal electrodes 410 and 411 are formed.

Subsequently, as shown in FIG. 11c, by using an etchant with which the mask 85 can be etched while leaving the material forming the lead electrode 4100, wet etching is performed to remove the mask 85, thereby to form the concave portion 389 in the element-integration surface 2102. In the case that, for example, the lead electrode 4100 is formed of Au and the mask 85 is formed of NiFe, ferric chloride ($FeCl_3$) solution can be used as the etchant. Thereafter, a laser diode 40 is placed into the formed concave portion 389 in such a way that its edge 401 is parallel with the edge 2102a. Further, the laser diode 40 is aligned in such a way that the light-emission center 4000 is opposed to the light-receiving end surface 352 of the waveguide 35.

In the placement of the laser diode 40 on the lead electrode 4100, an evaporated film 86 of AuSn alloy, for example, is deposited on the lead electrode 4100, the laser diode 40 is placed on the evaporated film 86, and then the positioning of the laser diode 40 is performed. After that, the substrate is heated by, for example, a hot plate under a hot wind by a blower up to approximately 200 to 300° C. (degrees centigrade) to fix the laser diode 40 to the slider substrate 210. Lastly, the n-electrode 40a, which is the upper surface of the laser diode 40, is connected to the terminal electrode 411 by a solder ball bonding (SBB) method using the solder 4111 (FIG. 2). There may be used, as the solder 4111, a metal including, for example, Sn, Pb, Ag, Cu, Zn, Al, Bi, In or the like.

Thus, the mounting of the laser diode 40 in the element-integration surface 2102 is completed. As described above, according to the manufacturing method of the present invention, the laser diode 40 can be disposed in the element-integration surface 2102 during a thin-film process in which the waveguide 35 and so on are formed in the element-integration surface 2102. That is, the construction of the optical system can be completed in the stage of a wafer process. As a result, this construction can be relatively facilitated and simplified; thus, mass-productivity in the head manufacturing can be improved.

The method for disposing the laser diode 40 is not limited to the embodiment shown in FIGS. 11a1 to 11c. For example, it is possible that the waveguide 35 and so on are formed, then the entire integration surface 2102 is covered with the overcoat layer 38; thereafter, a predetermined portion on the overcoat layer 38 are etched with a photolithography method using photoresist masks to form the concave portion 389.

(Practical Examples)

Hereinafter, there will be shown the state of the near-field light radiated from a near-field light generating element provided in the thermally-assisted magnetic recording head according to the present invention, by using results of simulation analysis experiments performed as practical examples.

Figure 12A:
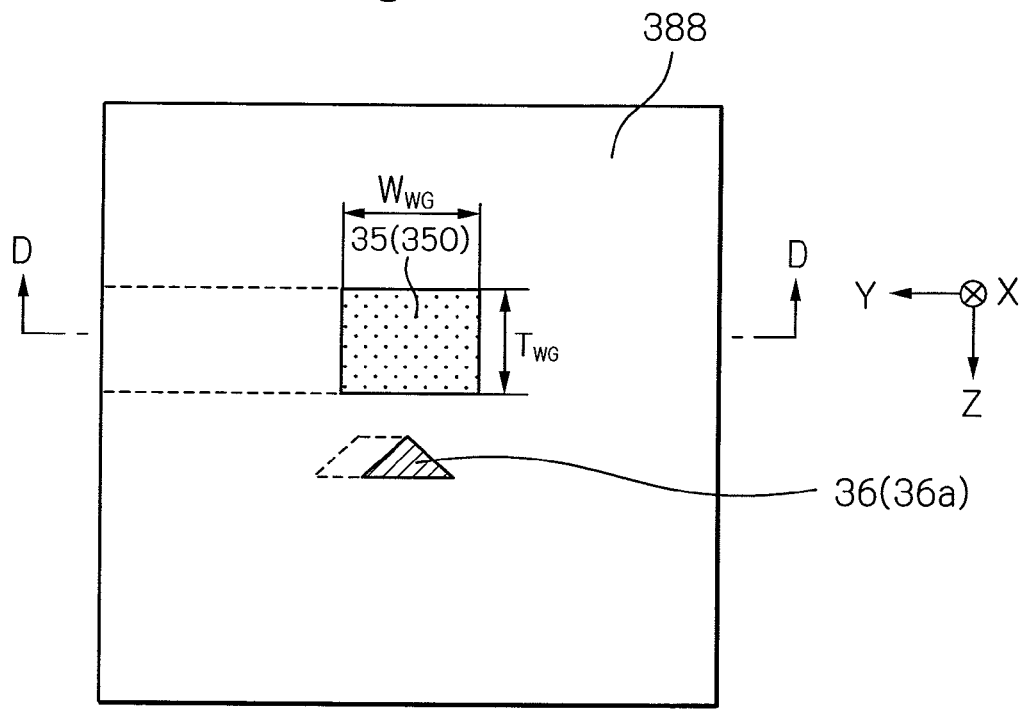
FIGS. 12a and 12b show schematic diagrams illustrating experiment conditions of the simulation analysis experiments performed as practical examples.
Figure 12B:
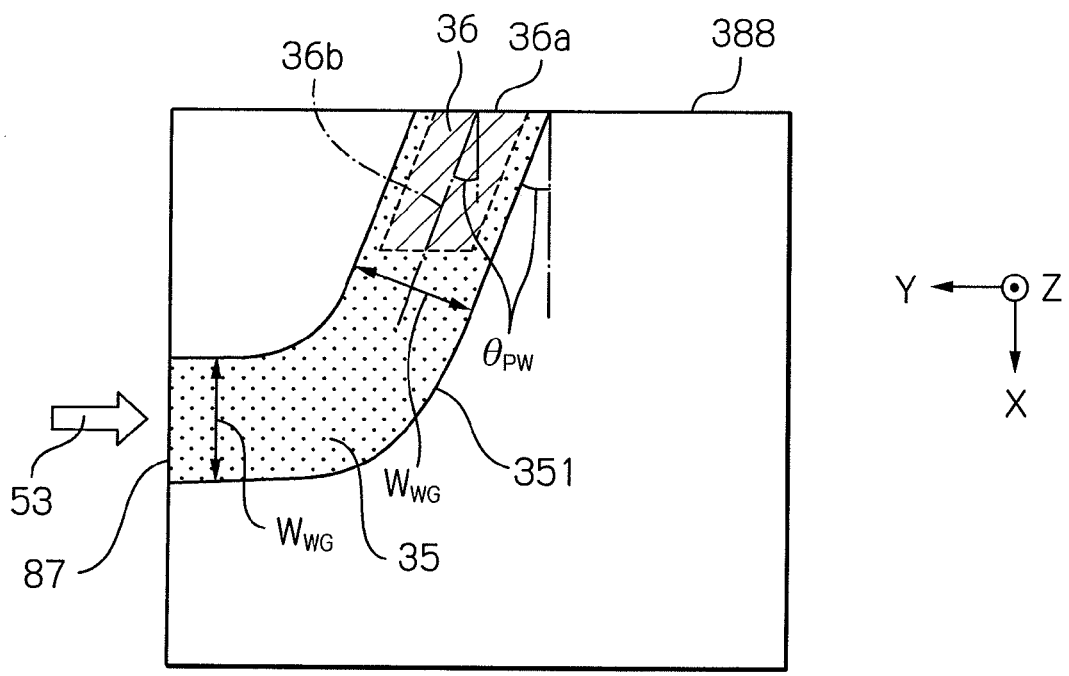

FIGS. 12a and 12b show schematic diagrams illustrating experiment conditions of the simulation analysis experiments performed as practical examples. Here, FIG. 12a is a top view of the experiment system viewed from a position above the head end surface 388, and FIG. 12b is a cross-sectional view taken along line D-D of FIG. 12a.

The simulation analysis experiments were performed by using the three-dimensional Finite-Difference Time-Domain method (FDTD method), which is an electromagnetic field analysis. Referring to FIGS. 12a and 12b, the system, by which the simulation analysis examinations were performed, was a rectangular parallelepiped area including: a head part having the waveguide 35, the surface plasmon antenna 36, and the overcoat layer 38 covering these elements; and an air layer (refractive index n=1) over the head end surface 338 of the head part. Incident laser light 53 was a Gaussian beam with a wavelength $\lambda_L$ of 650 nm and having a TM polarization (in which the oscillation direction of electric field of the laser light is perpendicular to a layer surface of the waveguide 35; that is, in Z-axis direction). The intensity $I_{IN}$ of the laser light 53 was 1 $(V/m)^2$.

The waveguide 35, as shown in FIG. 12b, extended in a curve from the light-receiving end surface 87 onto which the laser light 53 was launched, and reached the head end surface 388. The waveguide 35 was formed of $TaO_X$ (refractive index n=2.15) and the width $W_{WG}$ and thickness $T_{WG}$ were 250 nm throughout the waveguide. The surface plasmon antenna 36 had a width $W_{NF}$ of 160 nm, a thickness $T_{NF1}$ of 80 nm and a length $H_{NF}$ of 1.5 μm, and its constituent material was Ag (the real number part of the refractive index is 0.134, and the imaginary number part is 4.135). The near-field light generating end surface 36a of the surface plasmon antenna 36, which is positioned within the head end surface 388, had a shape of an isosceles triangle with an apex angle $\theta_{NF}$ of 900 and a height of 80 nm, in the case that an inclination angle $\theta_{PW}$, to be described below, was 0° (degree).

The overcoat layer 38 was formed of $Al_2O_3$ (refractive index n=1.65), and a portion of the overcoat layer 38 was the buffering portion sandwiched between the waveguide 35 and the surface plasmon antenna 36. That is, the refractive index of the buffering portion was 1.65. Further, a longitudinal axis 36b of the surface plasmon antenna 36 and the side surface 351 of the waveguide 35 in the vicinity of the head end surface 388 were inclined at an inclination angle $\theta_{PW}$ from the direction perpendicular to the head end surface 388 toward the light-receiving end surface 87, in the cross-section shown in FIG. 12b. The simulation analysis experiments were performed for respective cases in which the inclination angle $\theta_{PW}$ was 0° (degree), 30°, 60° and 80°. Here, the case that the inclination angle $\theta_{PW}$ was 0° corresponds to the embodiment of FIG. 4, and the respective cases that the inclination angle $\theta_{PW}$ was 30°, 60° and 80° correspond to the embodiment of FIG. 8d.

Under the experiment conditions described above, there were analyzed the intensity distributions on the head end surface (opposed-to-medium surface) 388 of the near-field light radiated from the surface plasmon antenna 36.

FIGS. 13a to 13d show schematic diagrams illustrating the relationship between the inclination angle $\theta_{PW}$ and the intensity distribution on the head end surface 388 of the near-field light radiated from the surface plasmon antenna 36. FIGS. 13a to 13d show end surfaces of the surface plasmon antenna 36 and the waveguide 35, which appear on the head end surface 388, in respective cases that the inclination angle $\theta_{PW}$ was 0°, 30°, 60° and 80°, and further show the intensity distribution (spot) of the near-field light in the vicinity of these end surfaces. Each of the end surfaces on the head end surface 388 of the waveguide 35 and the surface plasmon antenna 36 crosses slantwise the longitudinal axes of the waveguide 35 and the surface plasmon antenna 36, as the inclination angle $\theta_{PW}$ becomes larger. Therefore, in the case, each of the end surfaces has a shape extending longer in the track width direction (Y-axis direction). Here, the spot of near-field light on the head end surface 388 is defined as a distribution area of the near-field light having the intensity of $I_{MAX} \times e^{-2}$ (e: the base of natural logarithm) or more, where $I_{MAX}$ indicates the maximum intensity of the near-field light radiated from the surface plasmon antenna 36.

Figure 13A:
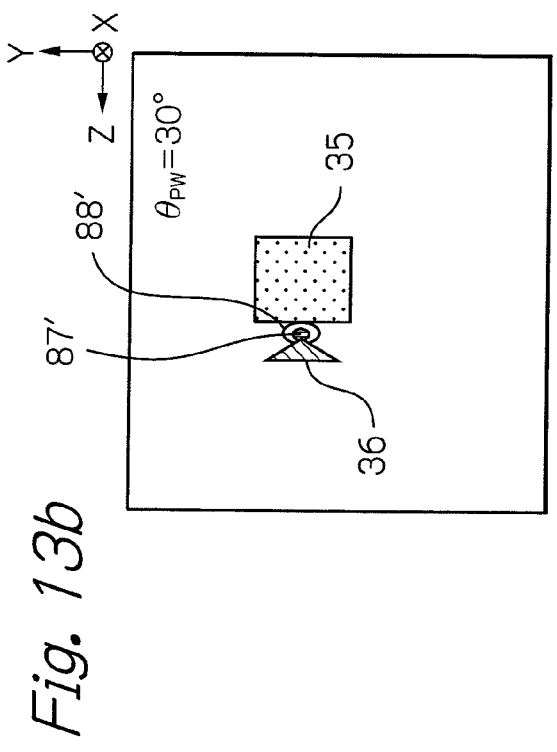
FIGS. 13a to 13d show schematic diagrams illustrating the relationship between the inclination angle $\theta_{PW}$ and the intensity distribution on the head end surface of the near-field light radiated from the surface plasmon antenna.
Figure 13B:
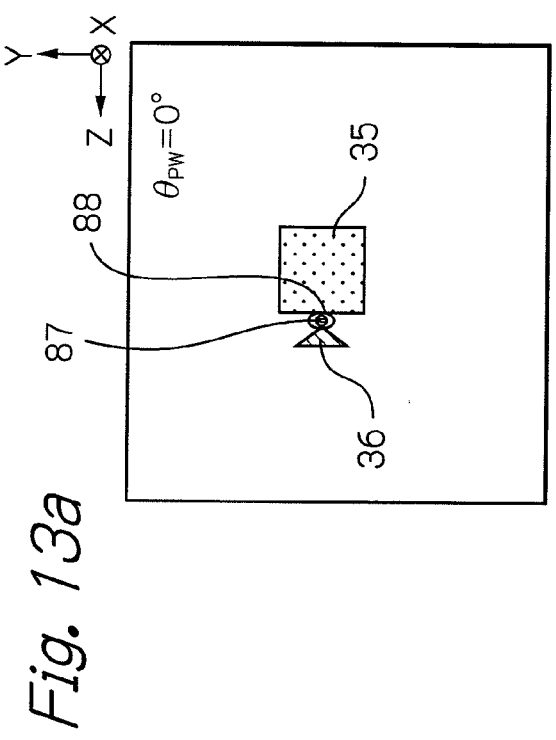

According to FIGS. 13a and 13b, in respective cases that the inclination angles $\theta_{PW}$ are 0° and 30°, distributions 87 and 87' of the near-field light are generated, each having a sufficient intensity for performing thermal assist, at the position of an apex of the near-field light generating end of the surface plasmon antenna. Spots 88 and 88' including respective distributions 87 and 87' with the sufficient intensity have a size of 50 nm or less, being confined to a relatively small size.

Figure 13C:
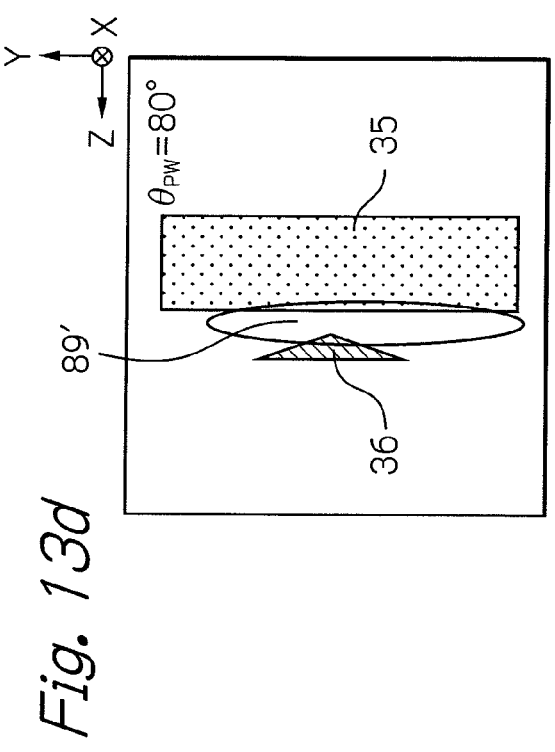
Figure 13D:
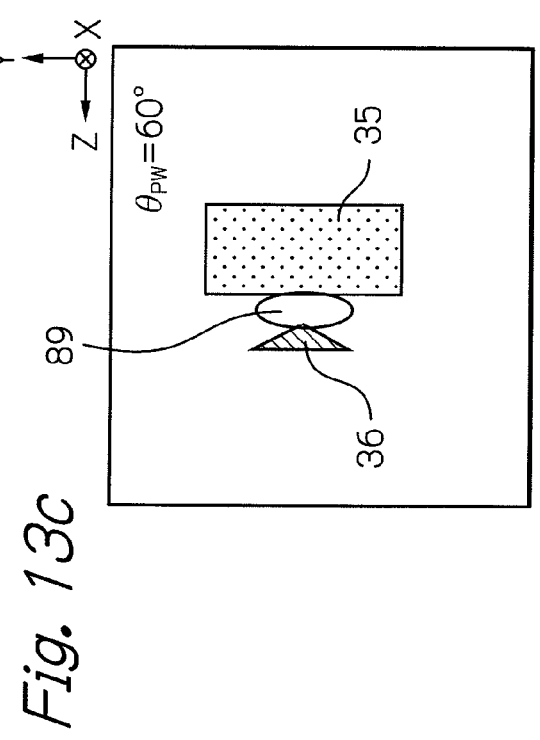

On the other hand, according to FIGS. 13c and 13d, in respective cases that the inclination angles $\theta_{PW}$ are 60° and 80°, spots 89 and 89' are generated, each expanding in the track width direction (Y-axis direction). Within these spots 89 and 89', an area of the near-field light having sufficient intensity for performing thermal assist does not exist. Thus, when the inclination angle $\theta_{PW}$ exceeds 30°, the spot diameter in the track width direction (Y-axis direction) increases largely. This results from the following reason: As the inclination angle $\theta_{PW}$ becomes larger, the propagation edge of the surface plasmon antenna becomes closer to the head end surface 388, and therefore a part of the surface plasmon propagating along the propagation edge tends to interact with the magnetic recording layer of a magnetic disk before reaching the end point of the propagation edge on the head end surface 388. From this, it is understood that, when the inclination angle $\theta_{PW}$ exceeds 30°, energy density within the spot of near-field light becomes lowered significantly.

Figure 14:
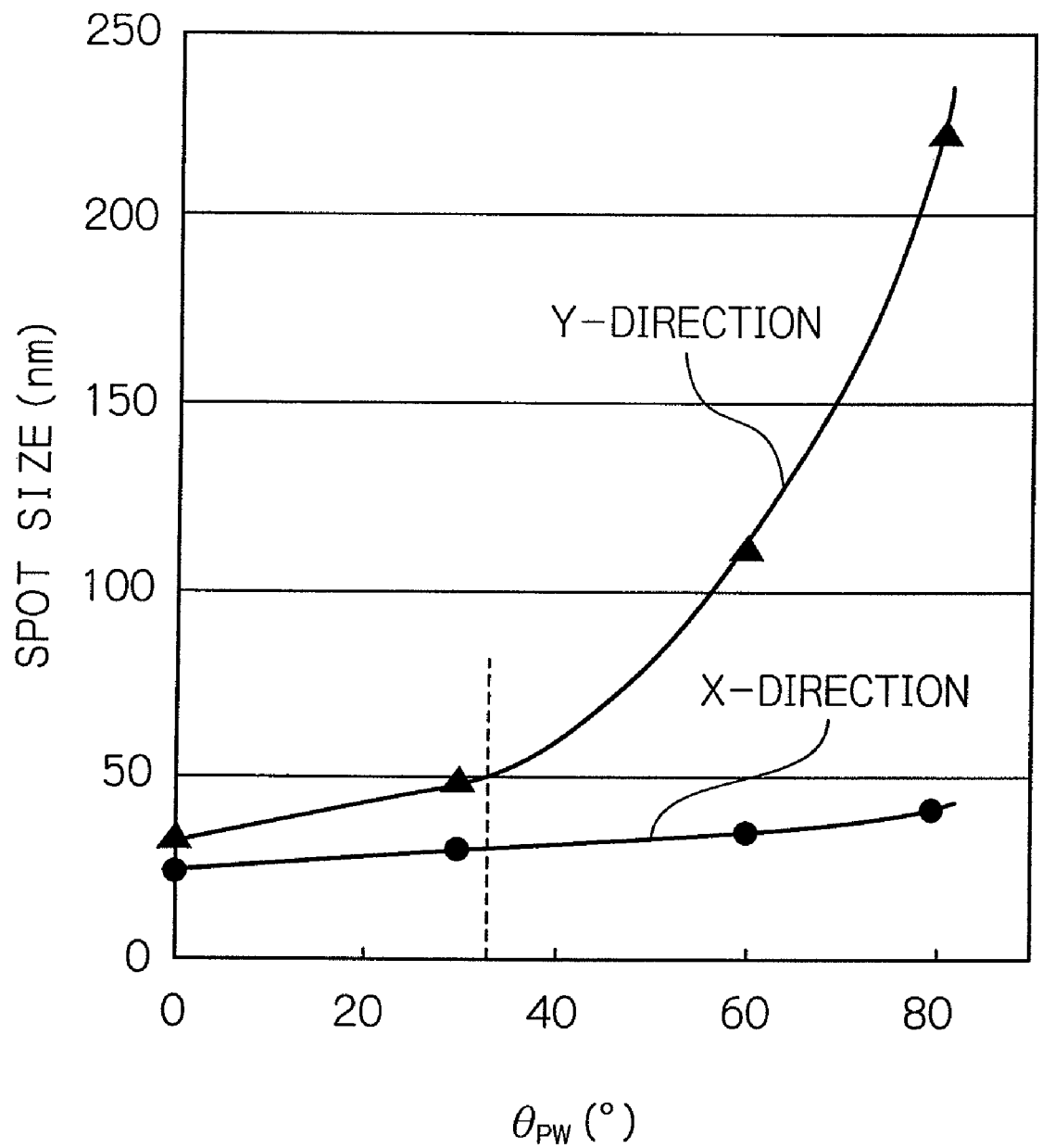
FIG. 14 shows a graph illustrating the relationship between the inclination angle $\theta_{PW}$ and the spot size, which is shown in Table 1.

Table 1 shows the relationship between the inclination angle $\theta_{PW}$ and the spot size of near-field light on the head end surface 388, which is obtained from the experiment results of FIGS. 13a to 13d. And FIG. 14 shows a graph illustrating the relationship between the inclination angle $\theta_{PW}$ and the spot size, which is shown in Table 1. Here, since the head end surface 388 is parallel with YZ plane, each spot size is presented with both maximum diameters in Z-axis direction (stacking direction) and Y-axis direction (track width direction).

TABLE 1

| Inclination angle $\theta_{PW}$ (°) | Spot size (nm) | |
|---|---|---|
| | Diameter in Z axis direction | Diameter in Y axis direction |
| 0 | 25 | 32 |
| 30 | 30 | 48 |
| 60 | 35 | 109 |
| 80 | 40 | 220 |

According to FIG. 14 and Table 1, the spot size of near-field light is confined to a small range in size of 50 nm or less in both Z-axis direction and Y-axis direction when the inclination angle $\theta_{PW}$ is in the range from 0° to 30°. On the contrary, it is understood that the spot size of near-field light in Y-axis direction increases to a value beyond 100 nm when the inclination angle $\theta_{PW}$ exceeds 30°.

From the above-described results, it is understood that the inclination angle $\theta_{PW}$ is preferably 0° or more, and 30° or less. By setting the inclination angle $\theta_{PW}$ to be 30° or less, the spot size of light (near-field light) in the near-field light generating end surface of the surface plasmon antenna can be made sufficiently smaller; thereby a desired portion on the magnetic recording layer of a magnetic disk can be heated effectively.

As described above, it is understood that there can be provided a thermally-assisted magnetic recording head in which a light source with sufficient power is disposed in the element-integration surface of a slider substrate to improve mass-productivity, and nevertheless light can effectively be guided to a desired position on the opposed-to-medium surface side without using a diffraction optical element. Thus, the present invention can achieve superior thermally-assisted magnetic recording, and contribute to the achievement of higher recording density, for example, exceeding 1 Tbits/in$^2$.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A thermally-assisted magnetic recording head comprising:
   a substrate having (a) an element-integration surface on which layers constructing components of the recording head are formed, the element-integration surface extending in a first plane and (b) an opposed-to-medium surface extending in a second plane perpendicular to the first plane, in the element-integration surface of the substrate, a light source mounted on said element-integration surface; a waveguide through which a light generated from said light source propagates; and a magnetic pole for generating a write field from its end on an opposed-to-medium surface side,
   an optical axis of said light source being one of (a) parallel with an edge on the opposed-to-medium surface side and parallel with said element-integration surface, and (b) inclined at a predetermined acute angle from said edge on the opposed-to-medium surface side and parallel with said element-integration surface.

2. A thermally-assisted magnetic recording head comprising:
a substrate having (a) an element-integration surface on which layers constructing components of the recording head are formed, the element-integration surface extending in a first plane and (b) an opposed-to-medium surface extending in a second plane perpendicular to the first plane, in the element-integration surface of the substrate, a light source mounted on said element-integration surface; a waveguide through which a light generated from said light source propagates; and a magnetic pole for generating a write field from its end on an opposed-to-medium surface side,
an edge of said light source in a direction along an optical axis being one of (a) parallel with an edge on the opposed-to-medium surface side and parallel with said element-integration surface, and (b) inclined at a predetermined acute angle from said edge on the opposed-to-medium surface side and parallel with said element-integration surface.

3. The thermally-assisted magnetic recording head as claimed in claim 2, wherein, in said element-integration surface, further provided is a plasmon antenna that excites surface plasmon by receiving the light propagating through said waveguide and generates near-field light from its end on the opposed-to-medium surface side.

4. The thermally-assisted magnetic recording head as claimed in claim 3, wherein said plasmon antenna is opposed to an end portion on the opposed-to-medium surface side of said waveguide with a predetermined distance.

5. The thermally-assisted magnetic recording head as claimed in claim 4, wherein said plasmon antenna comprises an edge which extends from its portion coupled with the light propagating through said waveguide in a surface plasmon mode to an near-field light generating end surface for generating near-field light; and on which surface plasmon excited by the light propagates.

6. The thermally-assisted magnetic recording head as claimed in claim 2, wherein a length of said edge of said light source in the direction along said optical axis is half or more the length of said edge on the opposed-to-medium surface side of said element-integration surface, and said waveguide and said magnetic pole are positioned apart from a centerline that indicates a center of said element-integration surface in a track width direction.

7. The thermally-assisted magnetic recording head as claimed in claim 6, wherein a center of gravity of said light source substantially resides on said centerline.

8. The thermally-assisted magnetic recording head as claimed in claim 2, wherein said light source is an edge-emitting laser diode with a cavity length of at least 300 micrometers.

9. The thermally-assisted magnetic recording head as claimed in claim 2, wherein said light source is an edge-emitting laser diode with an output power of at least 50 milliwatts.

10. The thermally-assisted magnetic recording head as claimed in claim 2, wherein said waveguide extends in a curve in such a way that a light incident on a light-receiving surface of said waveguide travels forward in a curve and reaches a portion on the opposed-to-medium surface side of said waveguide.

11. The thermally-assisted magnetic recording head as claimed in claim 2, wherein, in said element-integration surface, further provided is a light-path changing means for changing a traveling direction of the light from said light source to a direction toward the opposed-to-medium surface.

12. The thermally-assisted magnetic recording head as claimed in claim 5, wherein a longitudinal axis of said plasmon antenna is inclined within said element-integration surface from a direction perpendicular to said edge on the opposed-to-medium surface side of said element-integration surface toward a surface including a light-emission center of said light source.

13. The thermally-assisted magnetic recording head as claimed in claim 5, wherein an angle, formed between a longitudinal axis of said plasmon antenna and a direction perpendicular to said edge on the opposed-to-medium surface side of said element-integration surface, 30 degrees or less, said angle being formed, within said element-integration surface, toward a surface including a light-emission center of said light source.

14. A head gimbal assembly comprising: a thermally-assisted magnetic recording head as claimed in claim 2; and a suspension supporting said thermally-assisted magnetic recording head.

15. The head gimbal assembly as claimed in claim 14, wherein a photo-detector for measuring an output power of said light source to adjust the output power is provided in said suspension; said light source is an edge-emitting laser diode in which each of two end surfaces positioned opposite to each other includes a light-emission center; and further provided, in said element-integration surface, is a detection-waveguide and/or a light-path changing means for detection, used for guiding a light generated from an light-emission center on a side opposite to said waveguide to said photo-detector.

16. The head gimbal assembly as claimed in claim 15, wherein a through-hole is provided in said suspension; and said photo-detector is provided on said suspension and on a side opposite to said magnetic recording head in such a way to receive, through said through-hole, the light generated from the light-emission center on the side opposite to said waveguide.

17. A magnetic recording apparatus comprising:
at least one head gimbal assembly as claimed in claim 14;
at least one magnetic recording medium; and
a recording and light-emission control circuit for controlling light-emission operations of said light source and further controlling write operations which said thermally-assisted magnetic recording head performs to said at least one magnetic recording medium.

18. The magnetic recording apparatus as claimed in claim 17, wherein a photo-detector for measuring an output power of said light source to adjust the output power is provided in said suspension; said light source is an edge-emitting laser diode in which each of two end surfaces positioned opposite to each other includes a light-emission center; and further provided, in said element-integration surface, is a detection-waveguide and/or a light-path changing means for detection, used for guiding a light generated from an light-emission center on a side opposite to said waveguide to said photo-detector.

19. The magnetic recording apparatus as claimed in claim 18, wherein a through-hole is provided in said suspension; and said photo-detector is provided on said suspension and on a side opposite to said magnetic recording head in such a way to receive, through said through-hole, the light generated from the light-emission center on the side opposite to said waveguide.

* * * * *